Feb. 25, 1958     L. G. POLLARD ET AL     2,824,902
FACSIMILE TELEGRAPH APPARATUS FOR VARIABLE
BLANKING AND CARRIAGE RETURN
Filed Dec. 13, 1951     12 Sheets-Sheet 1
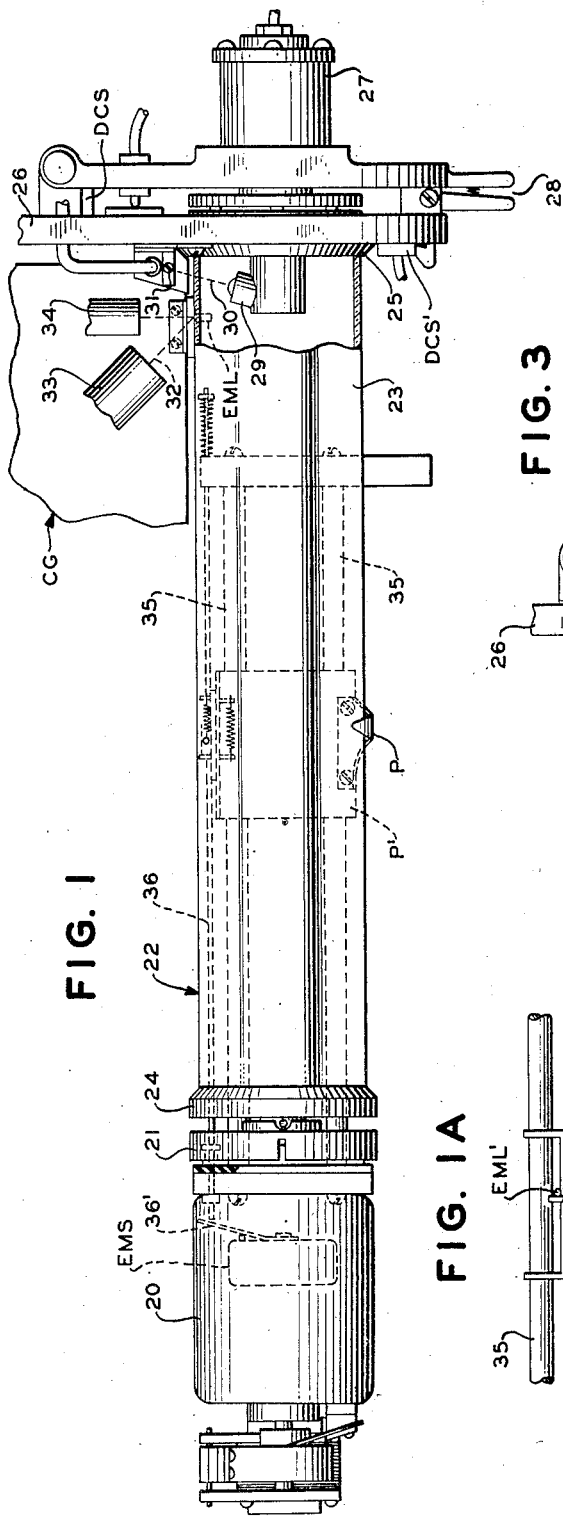
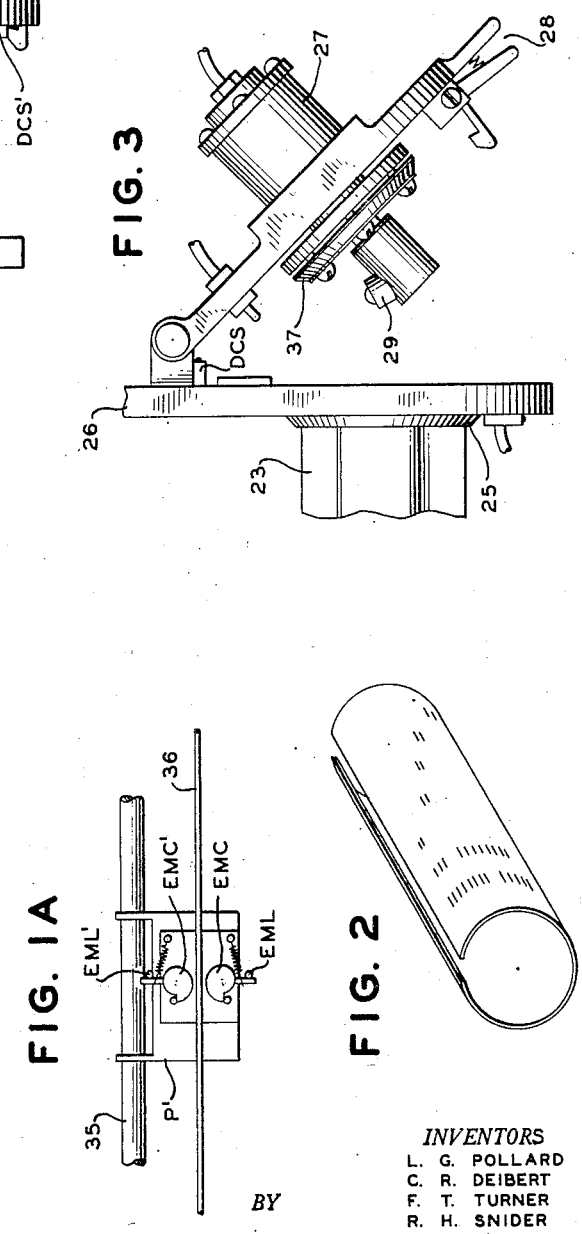
INVENTORS
L. G. POLLARD
C. R. DEIBERT
F. T. TURNER
R. H. SNIDER
BY *M. J. Reynolds*
ATTORNEY

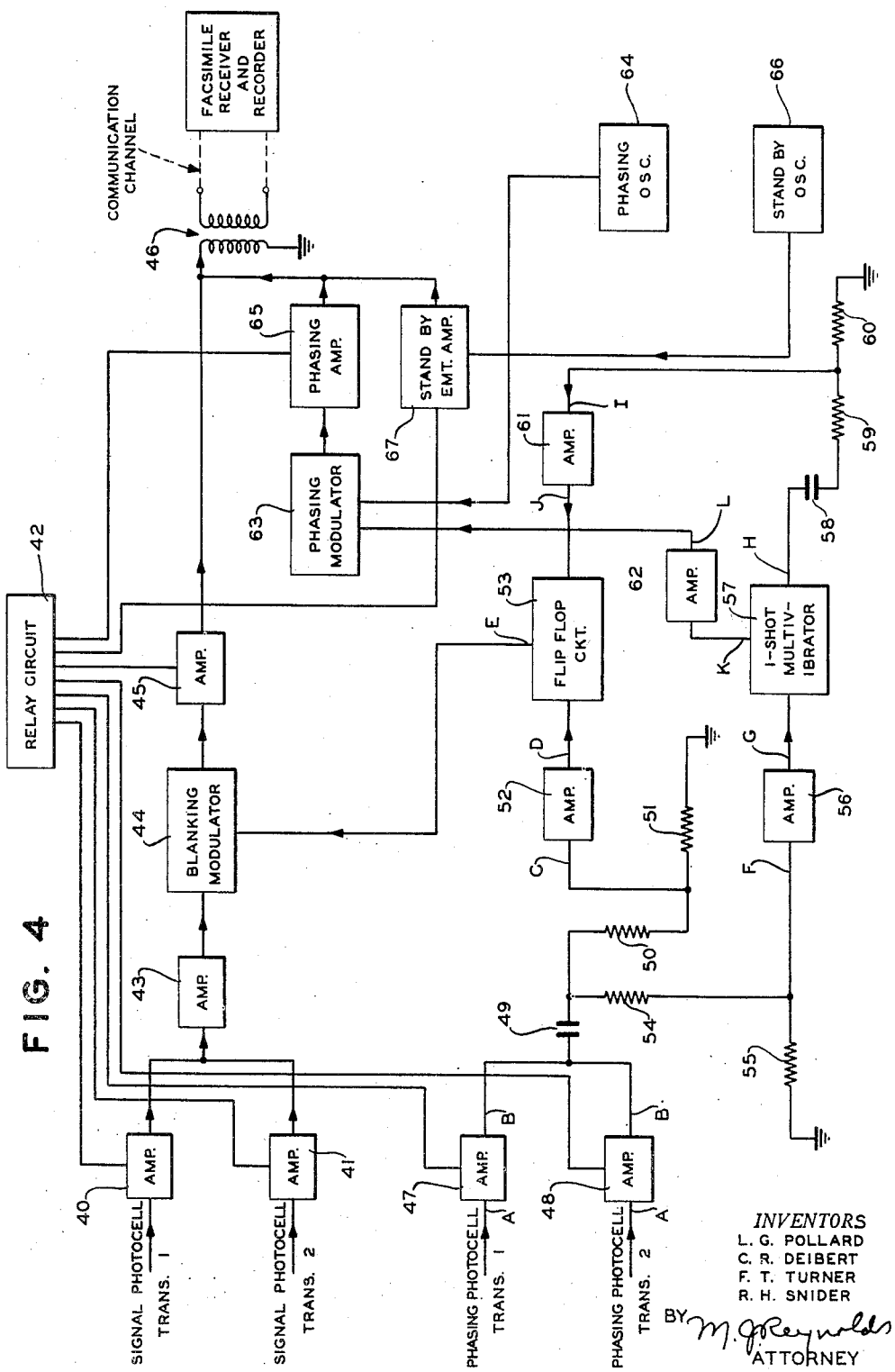

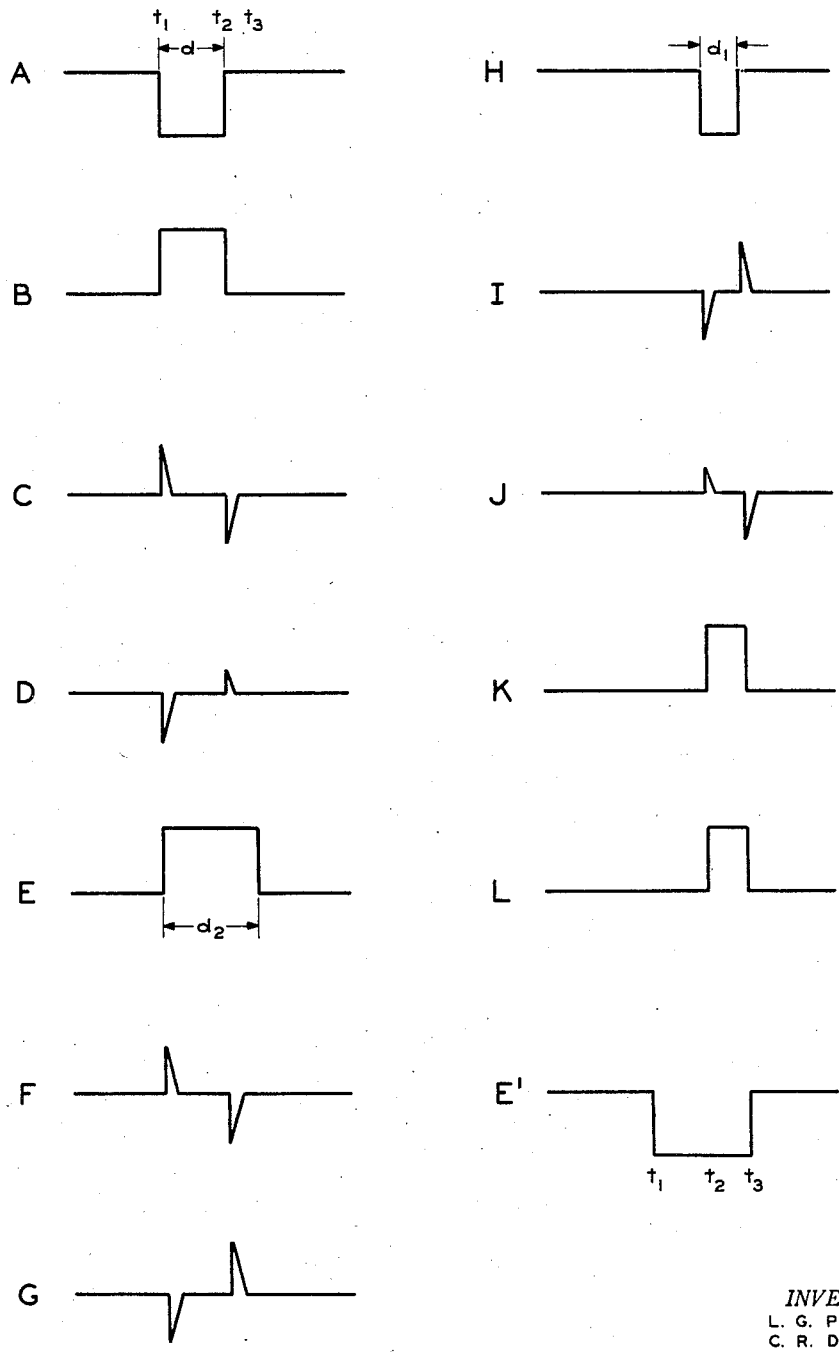

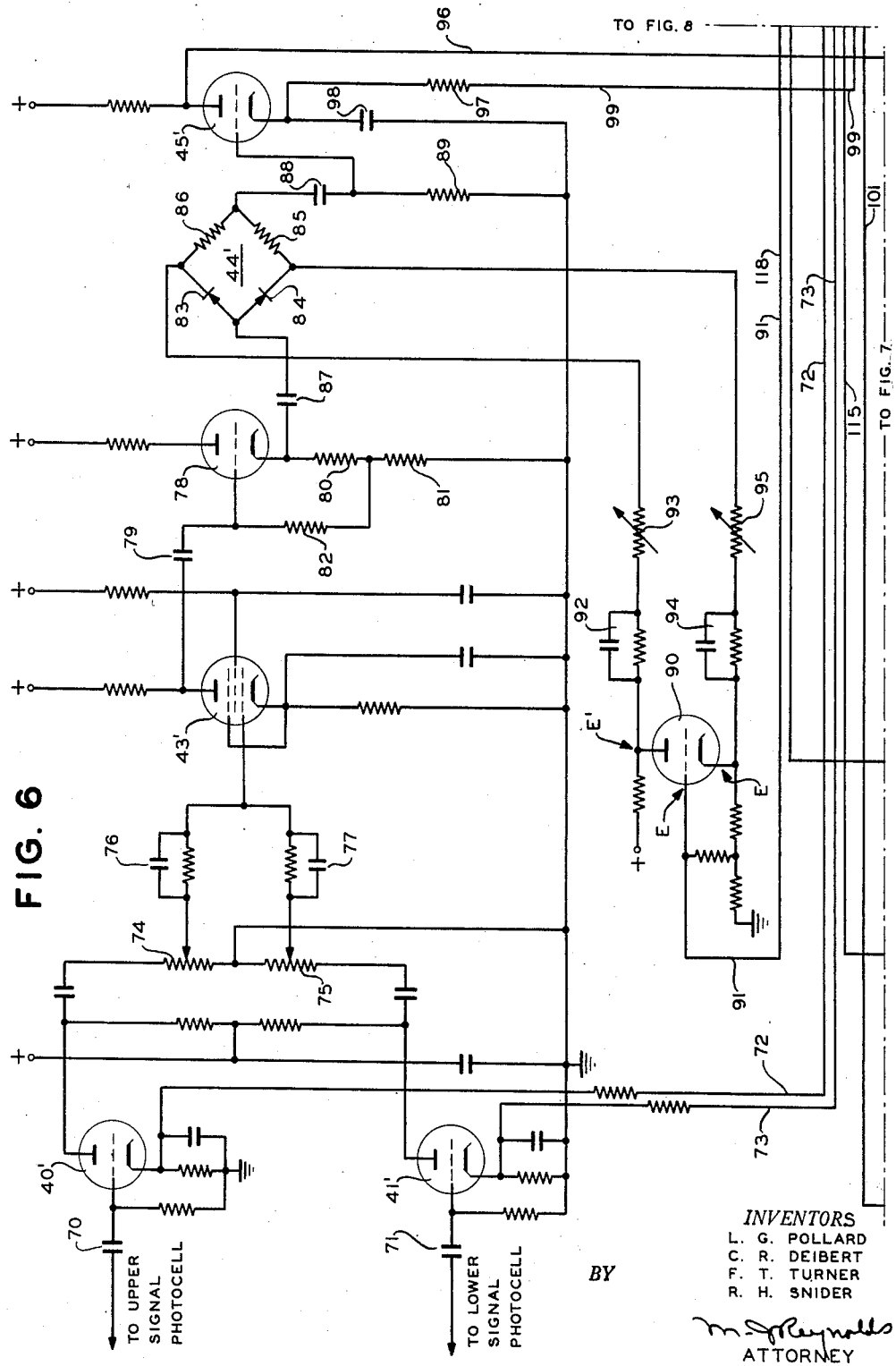

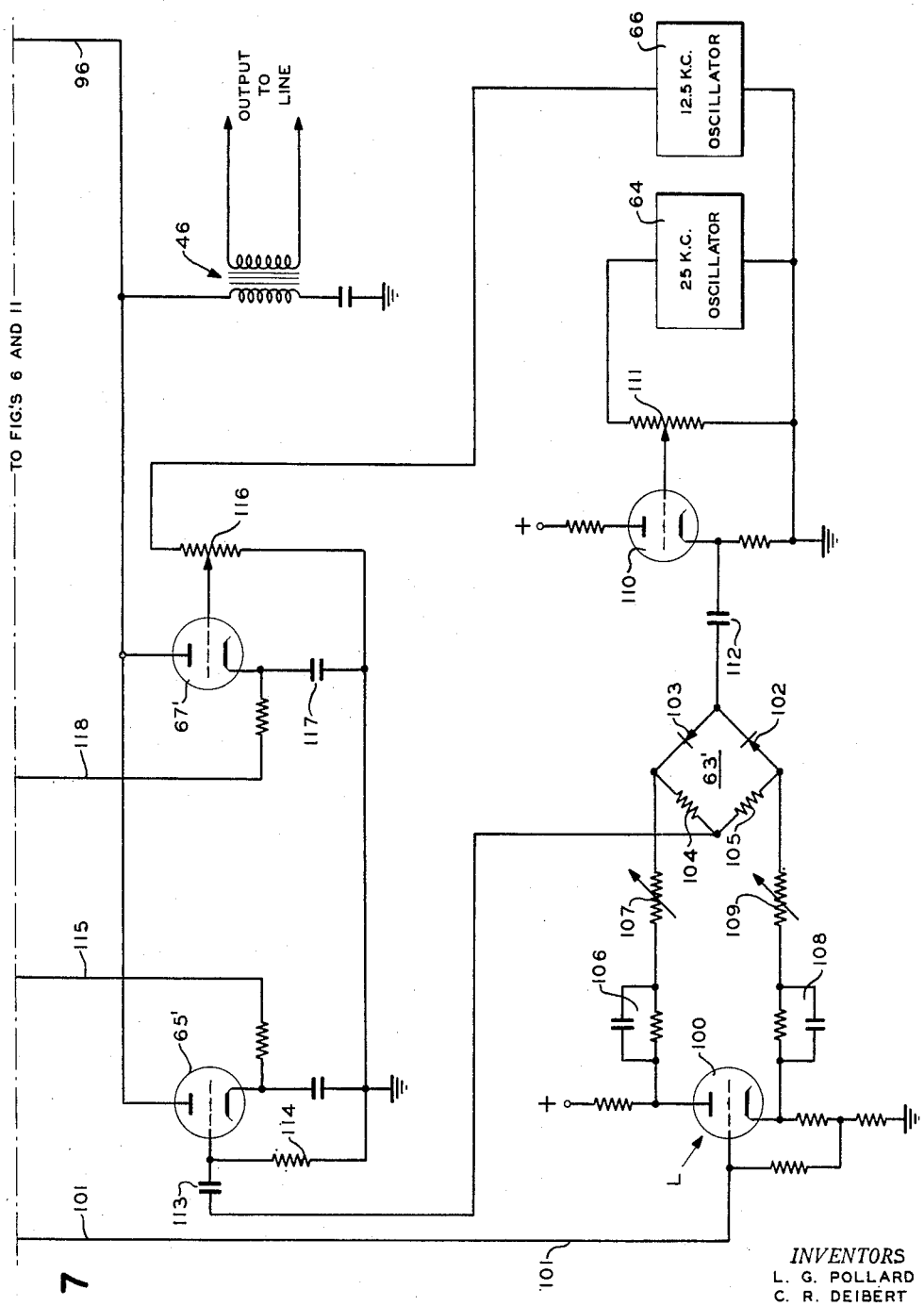

FIG. 8

FIG. 9
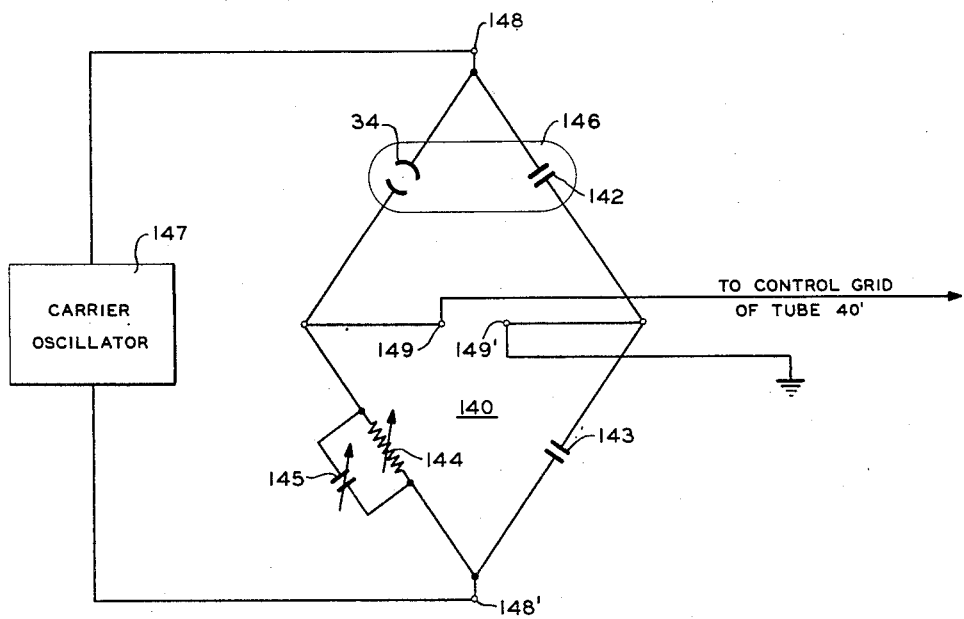
FIG. 10
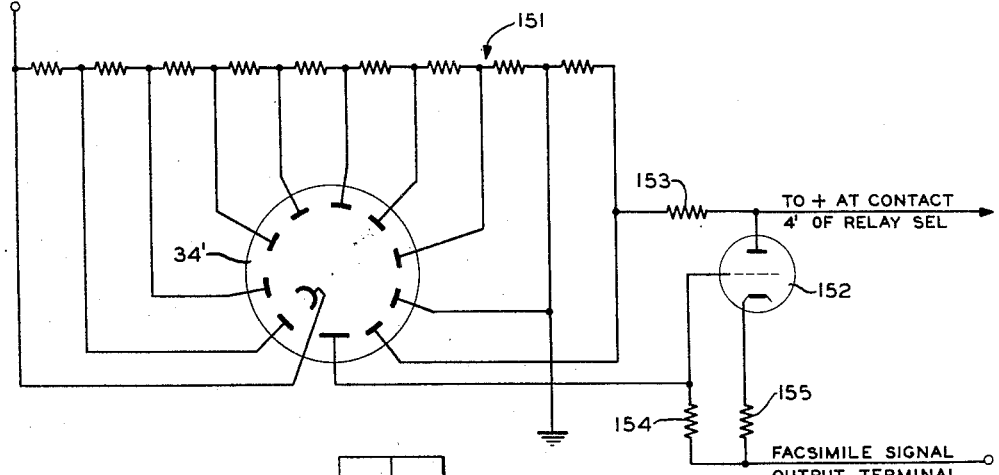
FIG. 16
| FIG. 12 | FIG. 14 |
| FIG. 13 | FIG. 15 |
| FIG. 6 OR FIG. 11 | FIG. 8 |
| FIG. 7 |
*INVENTORS*
L. G. POLLARD
C. R. DEIBERT
F. T. TURNER
R. H. SNIDER
BY
ATTORNEY Feb. 25, 1958     L. G. POLLARD ET AL     2,824,902
FACSIMILE TELEGRAPH APPARATUS FOR VARIABLE
BLANKING AND CARRIAGE RETURN
Filed Dec. 13, 1951     12 Sheets-Sheet 8

FIG. 11

INVENTORS
L. G. POLLARD
C. R. DEIBERT
F. T. TURNER
R. H. SNIDER
BY
ATTORNEY

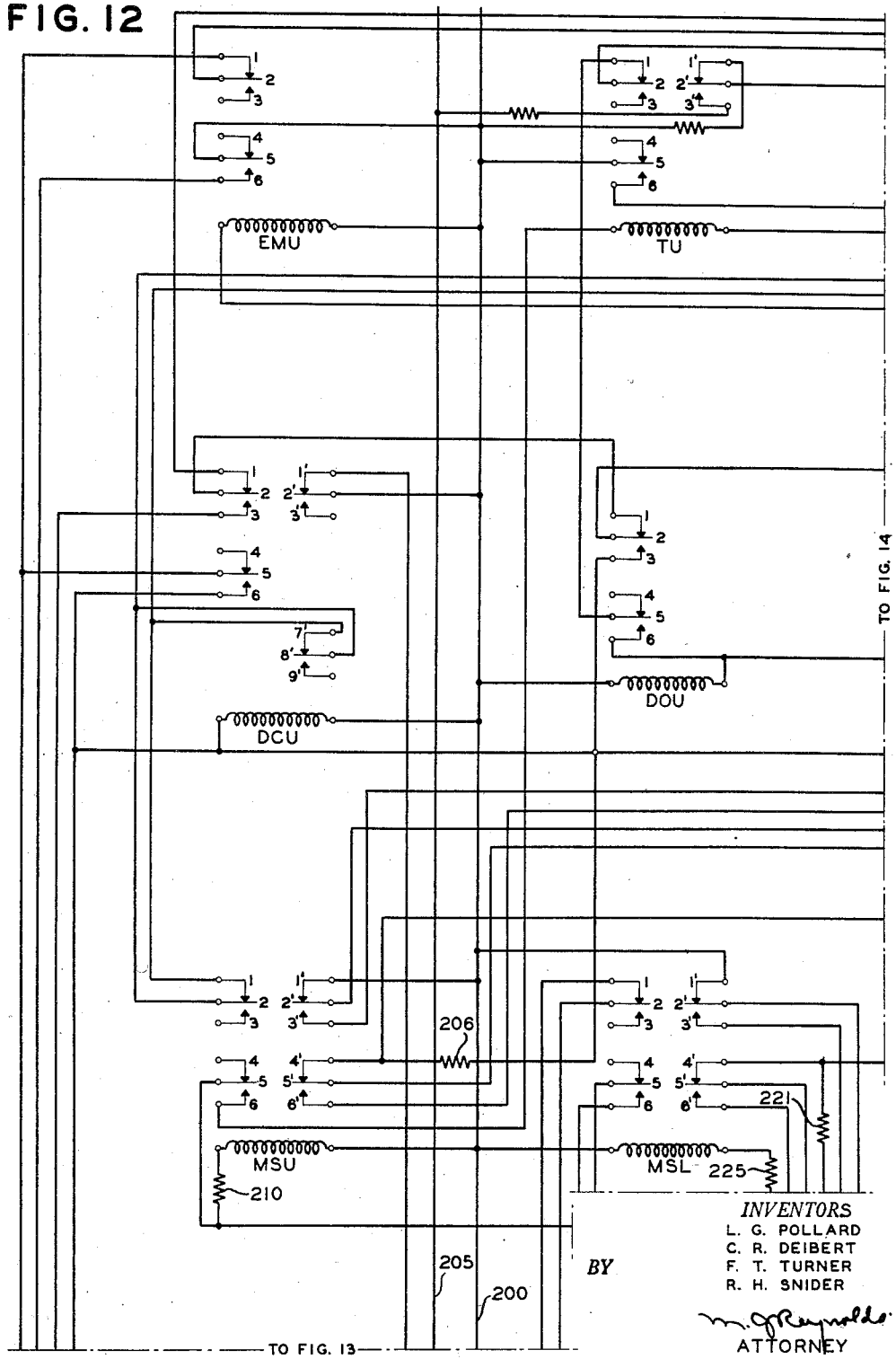

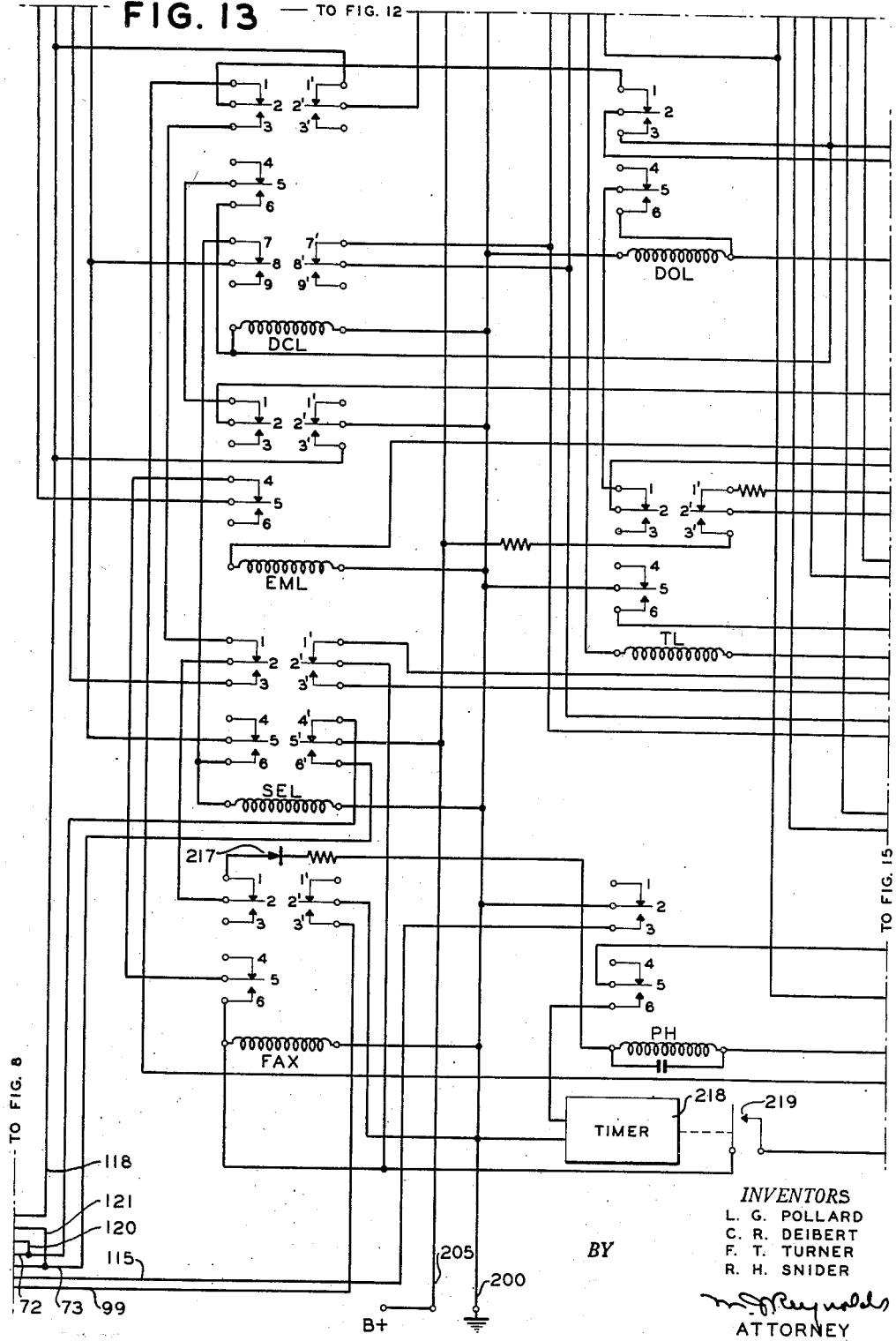

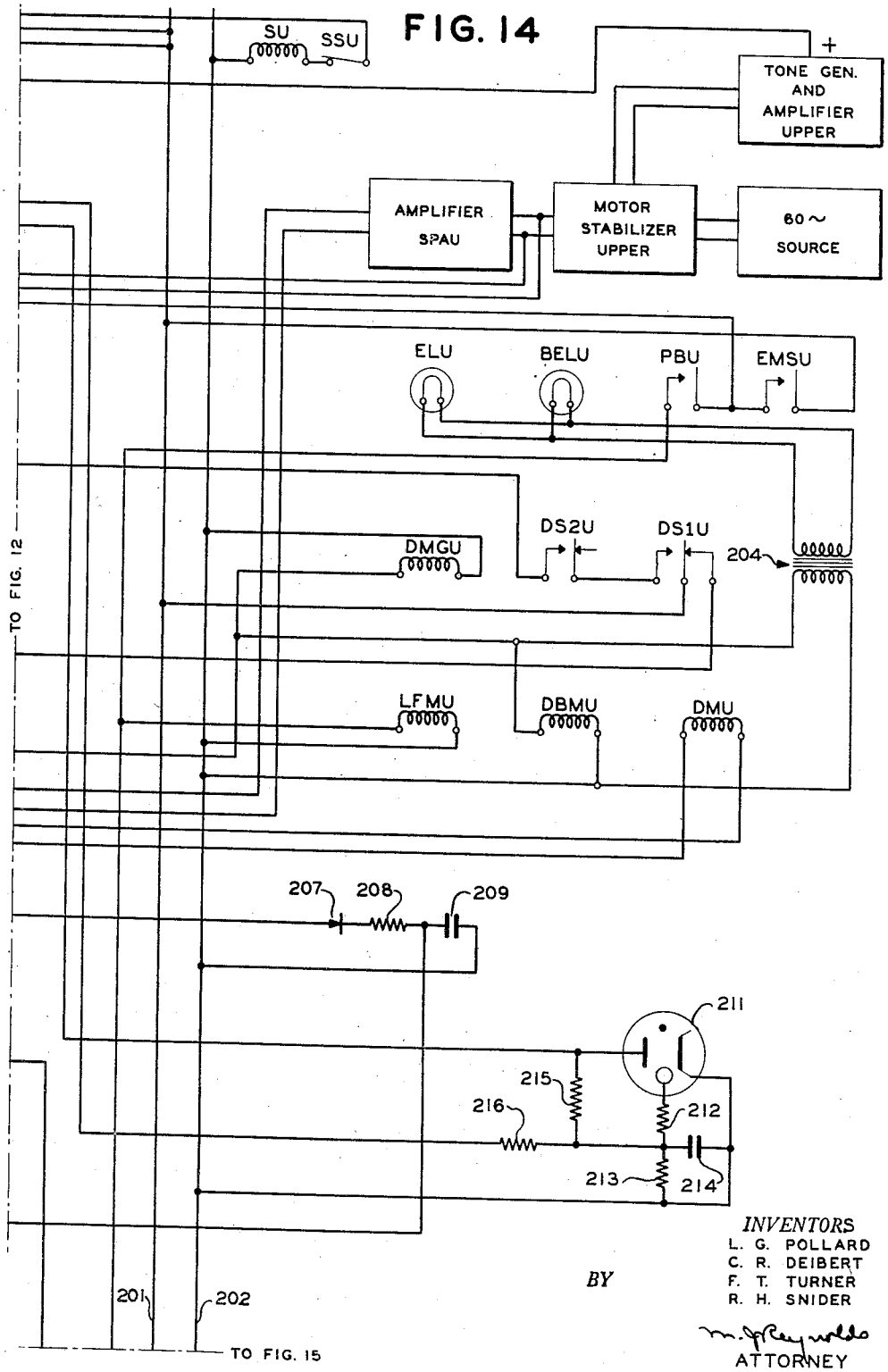

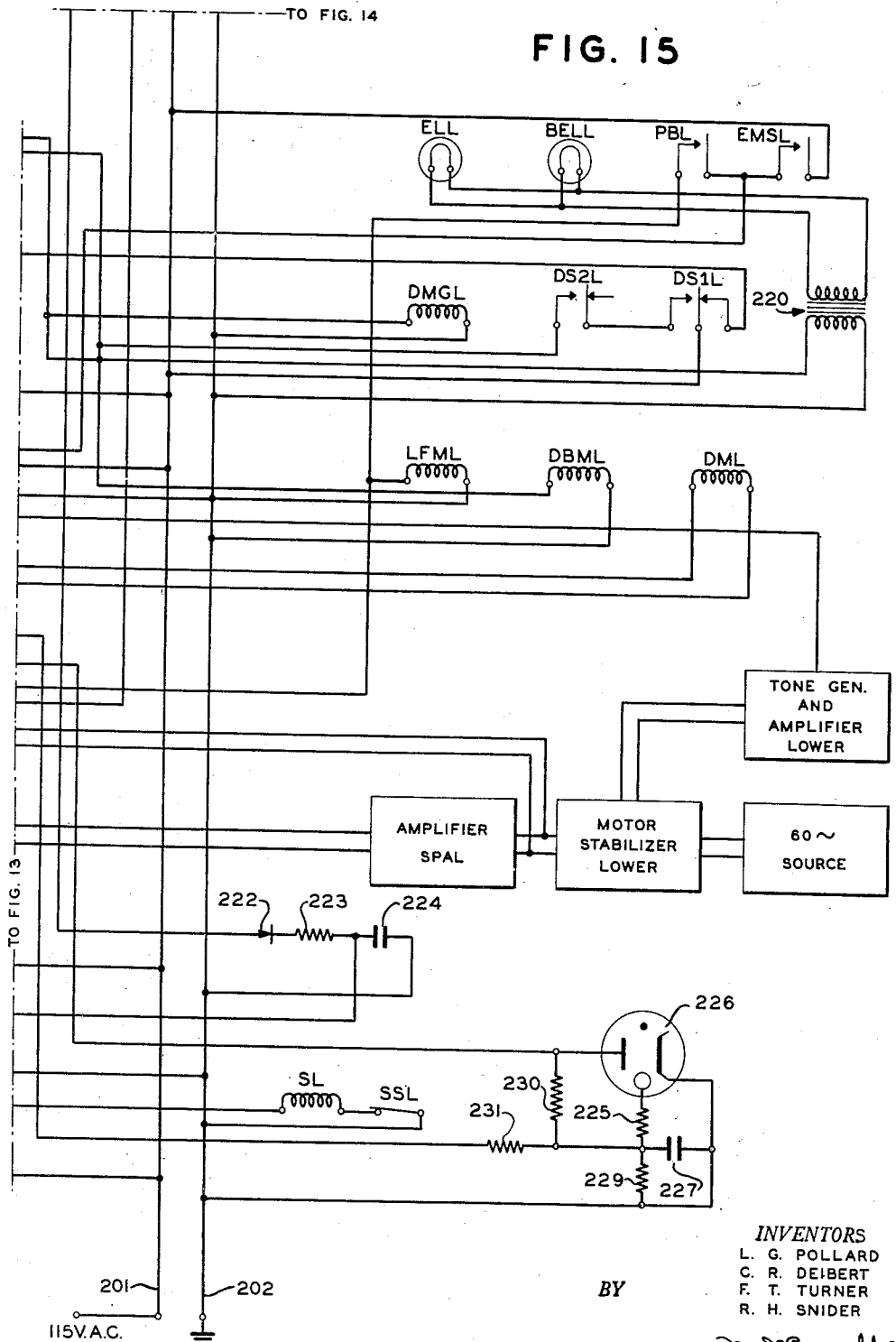

United States Patent Office
2,824,902
Patented Feb. 25, 1958

2,824,902

FACSIMILE TELEGRAPH APPARATUS FOR VARIABLE BLANKING AND CARRIAGE RETURN

Leon G. Pollard, Southampton, Clarence R. Deibert, Water Mill, Frank T. Turner, Hampton Bays, and Robert H. Snider, Southampton, N. Y., assignors to The Western Union Telegraph Company, New York, N. Y., a corporation of New York Application December 13, 1951, Serial No. 261,461

29 Claims. (Cl. 178—7.1)

The present invention relates primarily to telegraph communication by facsimile and more particularly to a novel and improved transmitting machine and associated control apparatus for transmitting subject matter such as pictures and messages at high speeds.

For efficient and satisfactory operation of facsimile apparatus at high speeds, generation and transmission of intelligence and phasing signals must be carefully controlled. Furthermore, means must be provided for generation and transmission of auxiliary signals such as standby and end-of-message tones and phasing signals. It is also desirable that means be provided for suppressing the transmission of intelligence signals during phasing intervals in order to minimize undesired marking of the recording copy sheet. To insure efficient use of a communication channel having a band width sufficiently great for transmission of facsimile signals at high speed, it is desirable that two or more transmitting machines be provided and that apparatus be provided to operate such machines successively. In this manner, loading of one machine may be effected during the transmitting interval of another machine.

In accordance with the above, the principal object of the invention is to provide a novel and improved facsimile transmitter and associated control circuits suitable for use at high speeds.

Another object of the invention is to provide means for suppressing transmission of signals from a facsimile transmitter during selected intervals.

Still another object of the invention is to provide means for successively operating a plurality of facsimile transmitters.

Further objects of the invention will appear from the following description.

In accordance with the invention, these objects are achieved by providing one or more facsimile transmitters, apparatus for scanning message blanks in the transmitter and having the subject matter to be transmitted delineated thereon, apparatus for scanning a portion of each message blank to produce a generally rectangular electrical impulse having a duration proportional to a dimension of the message blank, apparatus operated in a time sequence determined by the electrical impulse selectively to transmit facsimile signals and phasing signals, and relay means operated in accordance with the conditions of the transmitters to control transmission of facsimile, phasing, end-of-message and standby signals and to control operation of the transmitters.

The invention will now be described in greater detail with reference to the appended drawing in which:

Fig. 1 illustrates a facsimile transmitter in accordance with the invention;

Fig. 1A illustrates in detail a portion of Fig. 1;

Fig. 2 illustrates a message blank rolled for insertion in the message drum of Fig. 1;

Fig. 3 is a detailed view of another portion of Fig.1;

Fig. 4 is a block diagram illustrating facsimile transmission apparatus in accordance with the invention;

Fig. 5 is a series of wave shapes for explaining the operation of the arrangement of Fig. 4;

Figure 8:
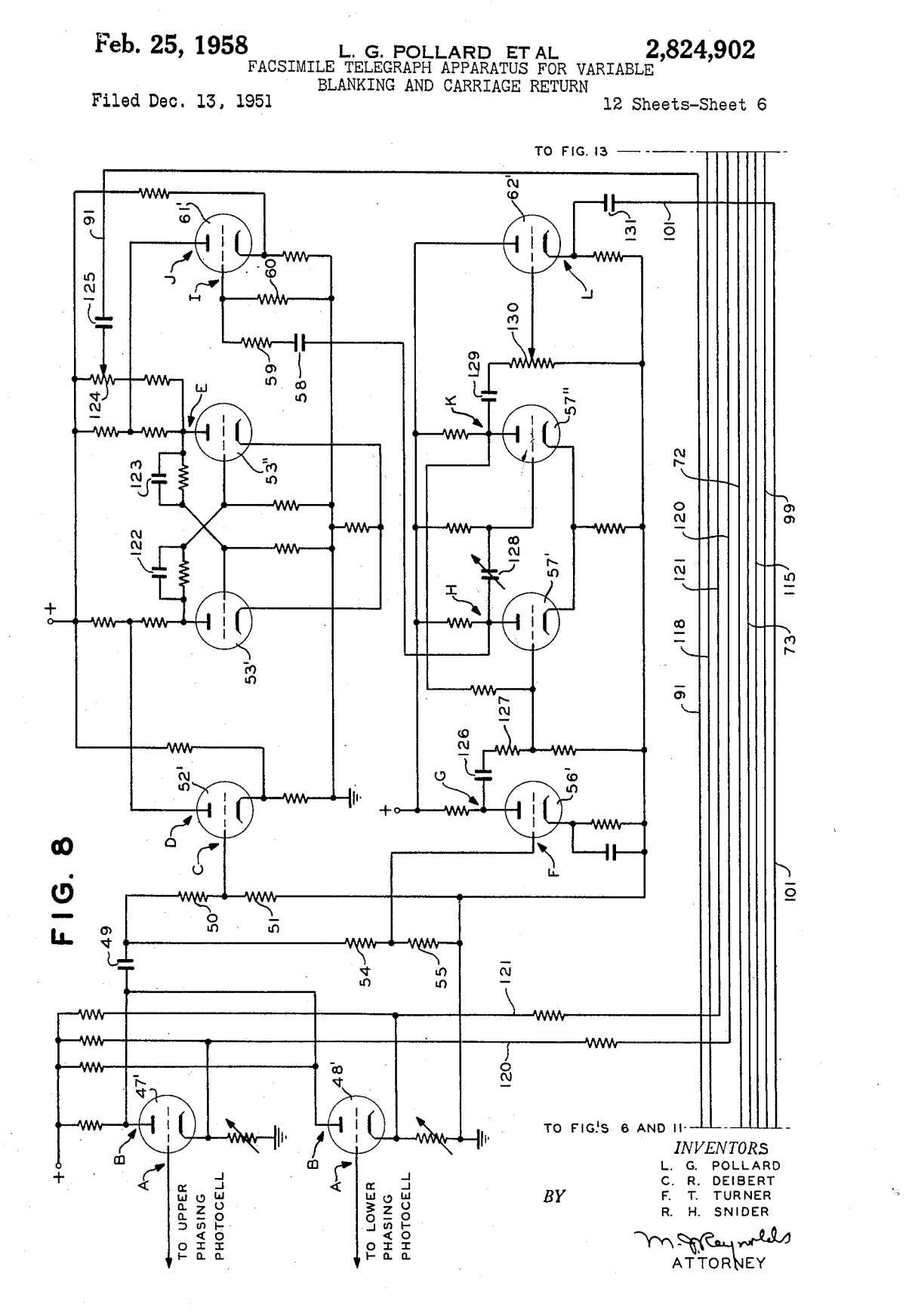

Figs. 6, 7 and 8 show in greater detail the arrangement of Fig. 4;

Fig. 9 illustrates a suitable photocell modulating arrangement for use with Fig. 4;

Fig. 10 shows another photocell circuit arrangement;

Fig. 11 illustrates a modulator for use with the photocell circuit of Fig. 10 and a modification of the circuit shown in Fig. 6;

Figs. 12 through 15 show a relay circuit for controlling operation of the apparatus shown in Figs. 1, 3, 4, 6 through 8, 10 and 11, and Fig. 16 illustrates the arrangement of Figs. 6 through 8 and 11 through 15.

Referring now to the drawing and more particularly to Fig. 1, an electric motor 20 is arranged to drive a tone generator 21 and a message drum 22. Tone generator 21, which forms part of a motor stabilization circuit, is fully described together with its circuit in the copending patent application of F. T. Turner et al., Serial No. 245,544, filed September 7, 1951, now U. S. Patent 2,715,202, issued August 9, 1955. Message drum 22 comprises a hollow transparent cylinder 23 firmly held between two hubs 24 and 25. Hub 25 is arranged to rotate within an aperture in an end plate 26. A door assembly 27 is rotatably fastened at an upper end thereof to end plate 26. The lower end of door 27 is fastened to end plate 26 by means of a latch 28. When door 27 is in its closed position, as shown in Fig. 1, an exciter lamp 29 is disposed within cylinder 23. A beam of light 30 from lamp 29 is directed onto a photocell 31.

The paper or other material on which is imprinted the intelligence to be transmitted is rolled, as shown in Fig. 2, and inserted in cylinder 23 in such a manner that the gap in the message blank extends longitudinally along cylinder 23. As the cylinder rotates, light from lamp 29 passes through the gap in the message blank and impinges on photocell 31 for a short period during each revolution of the cylinder. The largest message blank which may be employed is one having a length equal to the length of cylinder 23 and a width slightly less than the internal circumference of cylinder 23.

The message blank should be inserted so that the message faces outward. A light beam 32 from a source 33 is directed onto cylinder 23 and reflected from the message blank onto a photocell 34. The message blank is scanned by light beam 32 by causing cylinder 23 to rotate and by causing carriage CG, on which source 33 and photocell 34 are mounted, to travel at a predetermined rate toward the left end of cylinder 23. The mechanism for moving carriage CG is not illustrated, but might conveniently be a motor driven lead screw with a half-nut coupled thereto. The length of travel of the carriage may be adjusted in accordance with the length of the message blank by adjusting a pointer P to the end of the message blank. Pointer P is mounted on a plate P' which is carried below cylinder 23 on rods 35 and 35'. Also carried on plate P' are a pair of eccentric cams EMC and EMC', shown in Fig. 1A, which is another view of a portion of Fig. 1. Projections on cams EMC and EMC' are arranged to be engaged by lugs EML and EML' carried on carriage CG and of which lug EML may be seen in Fig. 1. When the cams are engaged as carriage CG reaches the left end of the message blank, the cams rotate inwardly, engaging a rod 36. Rod 36 is thus carried toward the left, actuating a lever 36' which, in turn, closes a switch EMS. Switch EMS energizes a relay circuit, to be described hereinafter, causing photocell 34 and its associated apparatus to be returned to the right end of cylinder 23. The carriage return may conveniently be effected through disengagement of the half nut and release of a spring compressed during the forward travel of the carriage. The relay circuit also performs certain other functions associated with the end of a message, which functions will also be described hereinafter.

In Fig. 3, door 27 is shown in a partly open position. As is illustrated in Fig. 3, a beveled annular disk 37 is arranged to rotate with a shaft mounted on bearing in the holder for lamp 29 and in the main body of door 27. When door 27 is in its closed position, disk 37 fits tightly against hub 25 and rotates with cylinder 23.

A pair of door interlock switches DCS and DCS' are arranged to be closed solely when door 27 is latched in its closed position. Switches DCS and DCS', which are included in a relay circuit to be described hereinafter, permit rotation of cylinder 23 only when door 27 is in its closed position.

A facsimile transmitter station may comprise one or more transmitters of the type shown in Figs. 1, 1A and 3. For convenience, the invention will be described in connection with two transmitters, although it is to be understood that any convenient number may be employed.

In Fig. 4, the modulated outputs of a pair of signal photocells, each corresponding to photocell 34 of Fig. 1, are applied, respectively, to amplifiers 40 and 41. A suitable modulating circuit is shown and described hereinafter in connection with Fig. 9. Amplifiers 40 and 41 are operative alternately under the control of a relay circuit 42, as will be described more fully hereinafter. The output of the operative amplifier is applied to another amplifier stage 43, the output of which is, in turn, applied to a blanking modulator 44. Blanking modulator 44 serves selectively to permit the transmission of the intelligence signal to an amplifier 45. The duration and timing of the blanking interval will be described hereinafter in connection with Fig. 5. The output of amplifier 45, which also is under the control of relay circuit 42, is applied to an output transformer 46, the secondary winding of which may be coupled to a transmission line, radio link or other suitable apparatus for transmission to a receiving station.

The outputs of a pair of phasing photocells, each corresponding to photocell 31 of Fig. 1, are applied, respectively, to amplifiers 47 and 48. Amplifiers 47 and 48 are rendered operative alternately under the control of relay circuit 42.

The phasing photocell output consists of negative rectangular voltage pulses, one such pulse being generated each time the gap in the message blank becomes disposed between photocell 31 and light source 29 of Fig. 1, i. e., once each revolution of cylinder 23. A typical pulse applied to amplifiers 47 or 48 at points A of Fig. 4 is shown in curve A of Fig. 5. The leading edge of rectangular pulse A appears at a time $t1$, which is the time in each revolution of drum 23 at which light beam 30 first passes through the gap in the message blank and impinges on photocell 31. The trailing edge of rectangular pulse A appears at a time $t2$, which is the time in each revolution of drum 23 at which light beam 30 is first interrupted by the message blank. In other words, the leading and trailing edges of pulse A correspond, respectively, to the sides of the gap in the message blank. The pulse duration $d$ is equal to the period of time required for the gap to pass through light beam 30 and hence is proportional to the width of the gap. Time duration $d$ will therefore vary with the width of the message blank employed.

Amplifiers 47 and 48 serve to amplify and invert the pulses, producing a positive rectangular pulse as shown in curve B of Fig. 5. Pulse B is passed through a first differentiating network comprising the series combination of capacitor 49 and resistors 50 and 51. The voltage appearing at the junction of resistors 50 and 51 has a wave shape as shown in curve C and comprises a sharp positive peak and sharp negative peak occurring at times $t1$ and $t2$, respectively. Voltage C is amplified and inverted in an amplifier 52, producing a voltage having a wave shape as shown in curve D. In curve D, the negative peak occurs at time $t1$ and the positive peak at time $t2$. However, amplifier 52 is operated on a portion of its characteristic curve at which the positive voltage peak will be substantially attenuated relative to the negative peak. Voltage D is applied to a flip-flop circuit 53. The term flip-flop circuit, as used in the specification and claims, means a circuit for producing a generally rectangular pulse, the circuit having a normal condition and an operated condition, switching therebetween being responsive to applied voltage peaks or pulses. The negative peak of voltage D triggers the flip-flop circuit, producing positive rectangular output pulses as shown at E and having a leading edge occurring at time $t1$.

Voltage pulse B is also applied to a second differentiating network comprising the series combination of capacitor 49 and resistors 54 and 55. The wave shape appearing at the junction of resistors 54 and 55 is shown at F and is similar to that at C. Voltage F is amplified and inverted in an amplifier 56, producing a wave G having a negative peak at time $t1$ and a positive peak at time $t2$. Wave G is applied to a one-shot multivibrator circuit 57 which is responsive solely to positive voltage peaks. Circuit 57 is thus not triggered until time $t2$. The constants of the multivibrator circuit are adjusted so that the output pulse duration $d1$ has a predetermined length. A suitable time $d1$ might be for instance, an interval corresponding to ⅛ inch of travel of the message blank.

Multivibrator 57 provides two outputs. A negative rectangular pulse at H is applied to a differentiating network comprising the series combination of a capacitor 58 and resistors 59 and 60. A voltage wave I appearing at the junction of resistors 59 and 60 consists of a negative peak at time $t2$ and a positive peak at time $t3$, time $t3$ corresponding to the end of period $d1$. Wave I is amplified and inverted in an amplifier 61, producing a wave J having a positive peak at time $t2$ and a negative peak at time $t3$. The negative peak of wave J releases flip-flop circuit 53, causing the trailing edge of the output wave thereof to occur at time $t3$. The output wave E of the flip-flop circuit is thus a positive rectangular pulse having a duration $d2$ equal to $d$ plus $d1$. In other words, wave E has a leading edge occurring at the time the gap in the message blank reaches light beam 30 and a trailing edge occurring a predetermined time interval $d1$ after the light beam is interrupted by the message blank. Output wave E is applied to blanking modulator 44 and serves to suppress transmission of intelligence during the gap interval, which is the time during which the signal photocell is scanning the gap in the message blank, and for a predetermined time interval thereafter. By adjusting the relative orientation of the signal and phasing photocells, the blanking interval may be made to extend for a short time both before and after the scanning of the message blank gap by the signal photocell. If time interval $d1$ corresponded to ⅛ inch of travel, the phasing photocell could conveniently be adjusted to lead the signal photocell by ¹⁄₁₆ inch. In this manner, blanking would occur for the period covered in scanning the gap and ¹⁄₁₆ inch on either side of the gap. Such an arrangement in effect provides a margin on the recording copy sheet.

A second output of multivibrator 57 is shown at K and comprises a positive rectangular voltage pulse extending from time $t2$ to time $t3$. Pulse K is amplified in a cathode follower amplifier stage 62, producing a positive rectangular voltage pulse L. Pulse L is applied to a phasing modulator 63. The pulse L which is applied to modulator 63, permits a phasing wave from a phasing oscillator 64 to be transmitted by modulator 63 to a phasing amplifier 65. Phasing amplifier 65, under control of relay circuit 42, passes the phasing wave to output transformer 46. The phasing wave may have any desired frequency, such as, for instance, 25 kc.

Another oscillator 66 is provided to generate a standby or end-of-message wave. This wave may also be given any desired frequency such as, for instance, 12.5 kc. The standby or end-of-message wave is transmitted to transformer 46 through an amplifier 67 under control of relay circuit 42. The various control functions of relay circuit 42 will be discussed more fully hereinafter in connection with Figs. 12 through 15.

The specific circuits indicated in Fig. 4 will now be described in detail in connection with Figs. 6, 7 and 8. Like elements in the different figures are given like characters. Similarly, the wave shapes shown in Fig. 5 and described in connection with Fig. 4 are equally applicable to Figs. 6, 7, 8 and 11.

Referring now to Fig. 6, the modulated signal photocell outputs from an upper and a lower transmitter are applied to the control grids of amplifier tubes 40' and 41', respectively, through capacitors 70 and 71, respectively. Tubes 40' and 41' are operated alternately in accordance with the particular transmitter being operated. Alternate operation is effected by selectively applying a positive bias in excess of the cut-off bias to the cathodes of tubes 40' and 41' through conductors 72 and 73, respectively. The selective application of positive bias is controlled by a relay circuit to be described hereinafter.

The outputs of tubes 40' and 41' are applied to remote ends of series connected potentiometers 74 and 75, respectively. The tappings of potentiometers 74 and 75 are intercoupled through resistance-capacitance networks 76 and 77, respectively, the junction of networks 76 and 77 being connected to the control grid of an amplifier tube 43'.

The output of tube 43' is applied to the control grid of a tube 78 through a capacitor 79. The cathode of tube 78 is coupled to ground through series connected resistors 80 and 81. The control grid of tube 78 is coupled to the junction of resistors 80 and 81 through a resistor 82. Tube 78 is connected as a cathode follower driver with respect to a modulator bridge network 44'. Bridge network 44' has four arms comprising, respectively, a rectifier element 83, a rectifier element 84, a resistor 85 and a resistor 86. The junction of rectifier elements 83 and 84 is coupled to the cathode of tube 78 through a coupling capacitor 87. The junction of resistors 85 and 86 is coupled to ground through a coupling capacitor 88 and a load resistor 89.

As was pointed out in connection with Fig. 4, it is desired to suppress transmission of facsimile signals during a blanking interval, the blanking interval consisting of the gap interval $d$ plus a predetermined time $d1$. Generation of the blanking impulse E will be described in detail hereinafter in connection with Fig. 8. Blanking impulse E is applied to the control grid of a phase splitting tube 90 through a conductor 91. The voltage at the anode of tube 90 will have a wave shape as shown in curve E' of Fig. 5. Wave E' is a negative pulse extending from time $t1$ to time $t3$. The voltage at the cathode of tube 90 will have a wave shape similar to that of the pulse E applied to the grid of tube 90.

The anode of tube 90 is coupled to the junction of rectifier element 83 and resistor 86 through a phase adjusting network including a resistance-capacitance network 92 and a variable resistor 93. The cathode of tube 90 is coupled to the junction of rectifier element 84 and resistor 85 through a phase adjusting network including a resistance-capacitance network 94 and a variable resistor 95. Rectifier element 83 is so poled that, when the negative voltage pulse E' from the anode of tube 90 is applied to the junction of rectifier element 83 and resistor 86, signal currents from tube 78 will not pass therethrough. Similarly, rectifier element 84 is so poled that, when the positive voltage pulse E from the cathode of tube 90 is applied to the junction of rectifier element 84 and resistor 85, signal currents from tube 78 will not pass therethrough. In other words, modulator 44' is cut off during the blanking interval. At other times, signal currents pass through modulator 44' and develop a signal voltage across resistor 89.

This signal voltage is applied to the control grid of an amplifier tube 45', the anode of which is connected to output transformer 46 of Fig. 7 through a conductor 96. Tube 45' is provided with a normal operating bias through a cathode biasing resistor 97 suitably by-passed by a capacitor 98. However, during the standby and phasing periods, it is desirable that tube 45' be cut off. For this purpose, the ground connection of resistor 97 is completed through a conductor 99 and a relay circuit to be described hereinafter. When it is desired to cut off tube 45', the ground connection is opened.

Generation of phasing impulse L of Fig. 5 will be described in detail hereinafter in connection with Fig. 8. Referring first, however, to Fig. 7, phasing impulse L is applied to the control grid of a phase splitting tube 100 through a conductor 101. The voltage pulse developed at the anode of tube 100 is a negative rectangular pulse extending from time $t2$ to time $t3$. The voltage pulse developed at the cathode of tube 100 has the same shape as impulse L applied to the grid thereof. The pulses developed at the anode and cathode of tube 100 are applied to a phasing modulator 63'.

Modulator 63' is a bridge network having four arms comprising, respectively, a rectifier element 102, a rectifier element 103, a resistor 104 and a resistor 105. The anode of tube 100 is coupled to the junction of rectifier element 103 and resistor 104 through a phase adjusting network comprising a resistance-capacitance network 106 and a variable resistor 107. The cathode of tube 100 is coupled to the junction of rectifier element 102 and resistor 105 through a phase adjusting network comprising a resistance-capacitance network 108 and a variable resistor 109.

The phasing signal to be transmitted which might be, for example, a 25 kc. oscillation, is generated in the oscillator 64. The output of oscillator 64 is applied to the control grid of an amplifier tube 110 through a potentiometer 111. The output of tube 110, which is connected as a cathode-follower amplifier, is applied to the junction of rectifier elements 102 and 103 through a coupling capacitor 112. The junction of resistors 104 and 105 is coupled to ground through a coupling capacitor 113 and a load resistor 114, resistor 114 also serving as a grid resistor for an amplifier tube 65'.

In the absence of a phasing impulse L at the control grid of tube 100, the potentials applied to rectifier elements 102 and 103 from the cathode and anode circuits, respectively, of tube 100 are such as to suppress transmission of the phasing signal from tube 110 to tube 65'. When the grid potential of tube 100 is increased by the application thereto of an impulse L, the anode and cathode potentials of tube 100 are decreased and raised, respectively, thereby permitting rectifier elements 102 and 103 to transmit the phasing signal to the control grid of tube 65'. Application of the phasing signal to the grid of tube 65' will thus occur once each revolution of the message drum for a time interval equal to time $d1$.

As will be explained more fully hereinafter, it is desired to transmit a phasing signal to the receiving station only for a predetermined time at the start of transmission. To suppress transmission of the phasing signal except during this period, the cathode of tube 65' is coupled to ground through a conductor 115 and a relay circuit to be described hereinafter. When it is desired to cut off tube 65', the ground return path is opened.

The 12.5 kc. or other oscillation, which may conveniently be used as a standby and as an end-of-message tone, is generated in an oscillator 66 and applied to the control grid of an amplifier tube 67' through a potentiometer 116. The anode of tube 67' is coupled to conductor 96 for application of the 12.5 kc. signal to output transformer 46. The cathode of tube 67' is coupled to ground through a capacitor 117 and also through a conductor 118. The ground return circuit through conductor 118 is completed through the relay circuits, to be described hereinafter, so that tube 67' is permitted to operate only when it is desired to transmit the 12.5 kc. signal.

Referring now to Fig. 8, the impulses A, the generation of which was described in connection with Fig. 4, are applied to the control grids of amplifier tubes 47' and 48', respectively. Tubes 47' and 48' are alternately rendered nonconductive in accordance with the operation of the associated transmitters by selectively applying a positive cutoff bias to the cathodes of tube 47' and 48'. Application of the positive cutoff bias to the cathodes of tubes 47' and 48', which is under control of the relay circuit to be described hereinafter, is effected through conductors 120 and 121, respectively.

The anodes of tubes 47' and 48' are interconnected and are coupled to the control grid of an amplifier tube 52' through a differentiating network comprising capacitor 49 and resistors 50 and 51. The wave shape of the voltage appearing at the grid of tube 52' is that shown in curve C of Fig. 5. Tube 52' is operated on a curved portion of its characteristic so that the positive excursion of the anode voltage is sharply attenuated. The anode voltage wave shape of tube 52' is shown in curve D of Fig. 5.

Tubes 53' and 53" are connected together in an Eccles-Jordan flip-flop circuit with tube 53' normally nonconducting and tube 53" normally conducting. The anode of tube 52' is coupled to the anode circuit of tube 53' so that the negative excursion of the anode potential of tube 52' reduces the anode potential of tube 53'. This negative excursion, which occurs at time t1 is repeated at the grid of tube 53" through a capacitor 122. The drop in potential of the grid of tube 53" reduces the anode current thereof which, in turn, increases the anode potential of tube 53". The rise in anode potential of tube 53" is repeated at the control grid of tube 53' through a capacitor 123. The resulting regenerative switching action renders tube 53' conductive and tube 53" nonconductive. Accordingly, the anode potential of tube 53" is changed very rapidly from a relatively low value to a relatively high value. A potentiometer 124 in the anode circuit of tube 53" is coupled to the control grid of tube 90 of Fig. 6, through a capacitor 125 and conductor 91 so that the rise in anode voltage of tube 53" initiates the blanking period. The flip-flop circuit will remain in the second condition until triggered back to its original condition.

The anodes of tubes 47' and 48' are also coupled to the control grid of a tube 56' through a differentiating network comprising capacitor 49 and resistors 54 and 55. The voltage waves appearing at the grid and anode of tube 56' are shown in curves F and G, respectively, of Fig. 5.

Tubes 57' and 57" are coupled together in one-shot multivibrator circuit arrangement with the duration of the switching cycle being the predetermined time interval d1 between times t2 and t3. Tube 57' is normally nonconductive and tube 57" is normally conductive. The anode of tube 56' is coupled to the control grid of tube 57' through a capacitor 126 and a resistor 127. The negative excursion of voltage wave G has no effect on nonconductive tube 57'. The positive excursion, however, initiates the regenerative switching cycle at time t2, rendering tube 57' conductive and tube 57" nonconductive. When the charge on capacitor 128 intercoupling the anode of tube 57' and the control grid of tube 57" leaks off sufficiently, a second switching action commences, rendering tube 57' nonconductive and tube 57" conductive.

The anode potential of tube 57', which exhibits a negative excursion at time t2 and which returns to its normal value at time t3 is shown in curve H of Fig. 5. This voltage is applied to the control grid of an amplifier tube 61' through a differentiating network comprising a capacitor 58 and resistors 59 and 60. The voltage waves appearing at the grid and anode of tube 61' are illustrated in curves I and J, respectively, of Fig. 5. The anode of tube 61' is connected to the anode circuit of tube 53". The positive excursion of voltage wave J, which occurs at time t2, has no effect on tube 53" because it is attenuated and because tube 53" is nonconductive at this time and hence has a high anode potential. The negative excursion of voltage wave J, which occurs at time t3, initiates a regenerative switching action rendering tube 53' nonconductive and tube 53" conductive. Therefore the anode potential of tube 53" drops at time t3, completing voltage wave E and terminating the blanking period.

The anode of tube 57" is coupled to the control grid of a tube 62' through a capacitor 129 and a potentiometer 130. Tube 62' is connected as a cathode follower amplifier, so that the voltage wave appearing at the anode of tube 57" and shown in curve K of Fig. 5 is repeated at the cathode of tube 62'. This latter voltage wave, which is shown in curve L of Fig. 5, exhibits a positive excursion at time t2 and a drop at time t3. The cathode of tube 62' is coupled to the control grid of tube 100 of Fig. 7, through a capacitor 131 and conductor 101 so that voltage wave L serves to control phasing modulator 63'.

There are a number of modulating circuits suitable for modulating the output of the signal photocells prior to application of the facsimile signals to amplifier tubes 40' and 41'. One such circuit is illustrated in Fig. 9. In Fig. 9, a modulating bridge circuit 140 has four arms comprising, respectively, a photocell 34, a capacitor 142, a capacitor 143, and the parallel combination of a variable resistor 144 and a variable capacitor 145. Photocell 34 and capacitor 142 may conveniently be incorporated in an envelope 146. The fascimile carrier wave, which might be, for example, 25 kc., is derived from a carrier oscillator 147 and applied to terminals 148 and 148' of bridge circuit 140. The modulated carrier output is derived from terminals 149 and 149', terminal 149 being coupled to the control grid of either tube 40' or 41' of Fig. 6 and terminal 149' being grounded.

Photocell 34, when interposed in a light beam of varying intensity, acts essentially as a variable resistance element. Accordingly, if the bridge is balanced for the light intensity from the copy sheet background, a modulated output signal will be developed whenever the light beam scans a marked area of the copy sheet. When a copy sheet having a different background shade is inserted in the transmitting drum, the bridge circuit should again be balanced so that a minimum output is developed while the background is being scanned. Balancing the bridge is effected primarily by varying the value of resistor 144.

An alternative photocell arrangement is illustrated in Fig. 10 wherein the photocell is an electron multiplier phototube 34', the multiplier anodes of which are connected to respective tappings on a potentiometer 151. The left hand end of potentiometer 151 is supplied with a high positive potential. The right hand end of potentiometer 151 is coupled to the anode of an amplifier tube 152 through a resistor 153. The anode of tube 152 is supplied with an operating potential through the relay circuit to be described hereinafter. The relay circuit supplies a positive potential during those intervals in the cycle when a signal output from amplifier 152 is desired. In this respect, the relay connections for amplifier tube 152 and the connections for a similar tube associated with a second transmitter correspond to the relay connections for amplifier tubes 41' and 40' of Fig. 6 or tubes 40" and 41" of Fig. 11.

The output of phototube 34' is applied to the control grid of tube 152, a resistor 154 intercoupling the control grid of tube 152 and one end of a resistor 155. The other end of resistor 155 is connected to the cathode of tube 152. The facsimile output signal is developed at the junction of resistors 154 and 155, tube 152 being operated as a cathode follower amplifier. The cathode ground resistor for tube 152 is a potentiometer to be shown and described in connection with Fig. 11, which may be substituted for Fig. 6 in the system.

In Fig. 11, the respective opposite ends of a pair of series connected potentiometers 160 and 161 are coupled to a pair of facsimile signal output terminals. Each of these terminals may be the output terminal of a phototube-amplifier circuit of the type shown in Fig. 10. In this event, each of potentiometers 160 and 161 serves as the cathode-ground resistor for the associated cathode follower amplifier as described in connection with Fig. 10. For this purpose, the junction of potentiometers 160 and 161 is coupled to ground through a voltage regulator tube 162.

The sliders of potentiometers 160 and 161 are connected, respectively, to the control grids of a pair of amplifier tubes 40" and 41" connected in cathode follower circuit arangement. The cathodes of tubes 40" and 41" are interconnected and coupled to ground potential through a cathode resistor 163 and voltage regulator tube 162. Tube 162 serves as a low impedance path for tubes 40" and 41" and as a source of D. C. bias for the associated photocell amplifier tubes such as tube 152 of Fig. 10. The anodes of tubes 40" and 41" are coupled to a source of positive potential through conductors 73' and 72', respectively, and through the relay circuit to be described hereinafter. Conductor 73' and 72' correspond, respectively, to conductors 73 and 72 of Fig. 6. It will be remembered that conductors 72 and 73 of Fig. 6 apply positive potentials to the cathodes of tubes 40' and 41', respectively, selectively to cut these tubes off at desired times. The same positive potentials supplied through these conductors at the same times will render tubes 40" and 41" conductive at the appropriate times. It will be noted that while conductor 72 is connected to the cathode of tube 40', conductor 72' is connected to the anode of tube 41". Similarly, conductor 73 is connected to the cathode of tube 41' while conductor 73' is connected to the anode of tube 40". Since tubes 40' and 41' correspond, respectively, to tubes 40" and 41", the reversed connections in Figs. 6 and 11 allow tubes 40" and 41" to follow the same time sequence of operations as tubes 40' and 41' with the same relay circuit connections. Conductors 73' and 72' of Fig. 11 should be considered as connected to conductors 73 and 72, respectively, of Fig. 8.

The facsimile signal appearing at the cathode of tube 40" or tube 41" is modulated, on a facsimile carrier from an oscillator 147, in a modulator 164. Modulator 164 comprises a pair of transformers 165 and 166. The primary winding of transformer 165 is supplied with the facsimile carrier wave through a potentiometer 167 intercoupling oscillator 147 and ground potential.

The facsimile signal appearing across cathode follower resistor 163 is supplied to a center tap of the secondary winding of transformer 165 through a large coupling capacitor 168 and a large resistor 169 shunted by a small capacitor 170. The junction of capacitor 168 and resistor 169 is coupled to ground through a rectifier 171 to form a D. C. restoration circuit. Rectifier 171 is poled so as to pass facsimile signals corresponding to the white or background level of the transmitted copy. Accordingly, each time the copy background is scanned, capacitor 168 will be discharged through rectifier 171, the discharging circuit having a relatively short time constant. When the intelligence markings are scanned, the facsimile signal will not pass through rectifier 171 but will charge capacitor 168 through the relatively long time constant charging circuit including resistor 169. It is evident that the D. C. or background level of the facsimile signal will be clamped to ground potential through the action of rectifier 171, thus insuring a constant transmitted background level irrespective of the background shade of the copy sheet. Capacitor 170, shunting resistor 169, provides high frequency compensation. In one embodiment of the invention, the constants of the D. C. restorer circuit were so chosen that satisfactory restorer action was achieved in transmission of continuous tone scale pictorial copy with a quarter inch copy sheet margin.

The terminals of the secondary winding of transformer 165 are coupled, respectively, to the terminals of the primary winding of transformer 166 through a resistor 172 and a rectifier 173 and through a resistor 174 and a rectifier 175, respectively.

Rectifiers 173 and 175 are poled and biased so as to provide a high or substantially infinite impedance to the background signal and a low impedance to the facsimile intelligence signals. The facsimile intelligence signal, which in Fig. 11 would have a positive polarity, effectively polarizes rectifiers 173 and 175, causing modulation of the facsimile intelligence on the carrier.

One end of the secondary winding of transformer 166 is connected to ground while the other end thereof is connected to the control grid of an amplifier tube 45" thereby applying the modulated facsimile carrier to tube 45". The other connections of tube 45" are identical with the connections of tube 45' of Fig. 6, so that the modulated facsimile output signal is selectively applied to output transformer 46.

Blanking signal E, the generation of which was described hereinbefore in connection with Fig. 8, is applied to the control grid of an amplifier tube 90'. The cathode of tube 90' is coupled to ground through series connected resistors 176 and 177. The junction of resistors 176 and 177 is coupled to the control grid of tube 90' through a grid resistor 178 shunted by a rectifier 179. Rectifier 179 together with resistor 178 and capacitor 125 of Fig. 8 form a D. C. restorer circuit which clamps the blanking pulse to ground potential thereby avoiding an apparent decrease in blanking pulse amplitude with increasing blanking pulse length.

The amplified blanking signal output of tube 90' is derived from the cathode thereof and applied through a capacitor 180 to the center tap of the primary winding of transformer 166. The effect of the blanking signal is to bias rectifiers 173 and 175 so that they remain nonconductive through the time interval $t_1$ to $t_3$.

A potentiometer 181 is coupled between a source of positive potential and ground. The slider of potentiometer 181 is coupled through a rectifier 182 to the end of capacitor 180 remote from the cathode of tube 90'. Rectifier 182 is so poled as to clamp the zero level of the blanking signal wave form to a fixed potential above ground, the fixed potential being determined by the adjustment of potentiometer 181. It will be noted that potentiometer 181 is included in the ground return circuit for the low facsimile-input side of modulator 164. Accordingly, potentiometer 181 may be set so that facsimile signals below a certain level will have no effect on modulator 164. In effect, potentiometer 181 provides a contrast control which may be set substantially to eliminate that portion of the facsimile signal which represents paper texture.

Referring now to Figs. 12 through 15, a relay system in accordance with the invention for controlling the starting and switching of the transmitters and associated apparatus of a two transmitter arrangement will be described. The relays intended to operate primarily in connection with one transmitter, herein termed the upper transmitter, are the end-of-message relay EMU, the door closed relay DCU, the motor start relay MSU, the timer relay TU and the door open relay DOU. The relays intended to operate primarily in connection with the other transmitter, herein termed the lower transmitter, are the end of message relay EML, the door closed relay DCL, the motor start relay MSL, the timer relay TL and the door open relay DOL. The three common relays are the selector relay SEL, the phasing relay PH and the facsimile signal relay FAX.

Before presenting a detailed description of the relay system and associated apparatus shown in Figs. 12 through 15, a brief overall description thereof will be given. When the power is turned on initially, a standby signal is transmitted from oscillator 66 of Fig. 7. When the door of the upper transmitter is opened, door open relay DOU becomes energized. Next a message blank is inserted in the upper transmitter and the door is closed, energizing door closed relay DCU through a door switch and contacts of relay DOU. Energization of relay DCU cuts off the standby signal, energizes a door latch magnet, a drum brake magnet and the exciter lamp power supply, and applies power line AC to the drum motor through contacts on motor start relay MSU. Energization of relay DCU also produces energization of selector relay SEL, thereby determining the association of amplifier circuits with the active transmitter. Relay SEL connects the carriage line feed motor on the upper transmitter to facsimile relay FAX which will cause the motor to operate at the proper time.

The voltage appearing across the drum motor is also applied through a rectifier to the winding of motor start relay MSU. As the motor speed rises, this rectified voltage increases until, as the drum motor approaches synchronous speed, the voltage becomes high enough to energize relay MSU. Energization of relay MSU transfers the drum motor from the AC line to a synchronous power amplifier which provides a highly controlled driving voltage therefor. Relay MSU also applies DC voltage to a delay circuit which, after a predetermined time interval during which the drum motor becomes stabilized, operates a glow discharge tube. The glow discharge tube energizes timer relay TU which, in turn, operates phasing relay PH.

Energization of relay PH completes the ground return path of tube 65' of Fig. 7 so that phasing impulses are transmitted to output transformer 46. Relay PH also operates a timer, the setting of which determines the duration of the phasing interval. At the end of the phasing interval, the timer operates facsimile relay FAX which permits transmission of facsimile signals from the upper transmitter photocell and which also energizes the upper transmitter line feed motor, providing scanning of the message blank. At the same time, operation of relay FAX releases relay PH, stopping transmission of phasing impulses.

While the message is being transmitted from the upper transmitter or at any time after the upper transmitter door is closed, the lower transmitter may be started in a similar manner. In this case, the lower transmitter, after operation of timer relay TL, runs idle until the end of the message on the upper transmitter.

At the end of the message on the upper transmitter, as determined by the setting of the end-of-message pointer, the end-of-message switch is operated, operating end-of-message relay EMU. Operation of relay EMU applies end-of-message tone to the line and restores the relays associated with the upper transmitter to their initial conditions. Deenergization of relay DCU applies power to a half-nut solenoid on the carriage, allowing the carriage to be returned to the starting point by a carriage return spring.

As soon as the carriage starts to return, the end-of-message switch is released, removing power from relay EMU and terminating transmission of the end-of-message tone.

As soon as relay SEL has become deenergized, a connection is made from relay TL to relay PH and a similar sequence of operations, commencing with transmission of the phasing impulses, is followed for the lower transmitter.

The operation is similar irrespective of which transmitter is started first, except for the operation of relay SEL, and continues as long as messages are to be transmitted. At the end of the last message, all relays return to their deenergized conditions and standby tone is applied to the line.

The relay system will now be described in greater detail. For convenience, the armatures and associated contacts of most of the relays have been divided into two groups, the armatures and contacts of one group for each relay being numbered consecutively from 1 and the armatures and contacts of the other group for each relay being numbered consecutively from 1'.

For simplicity, the various electrical connections will be described simultaneously with a detailed description of system operation.

Let it be assumed that there are two facsimile transmitters of the type shown in Fig. 1. Initially, both are idle. When the power is turned on and before anything else is done, it is desired to transmit the standby signal. It will be remembered that in order to transmit the standby signal, the ground return path through conductor 118 for tube 67' of Fig. 7 must be completed. At this time all of the relays are in their unoperated positions as shown in the drawing. The ground connection of conductor 118 may be traced from conductor 118, normally closed contact 1' and armature 2' of relay DCL, normally closed contact 1' and armature 2' of relay DCU and through conductor 200 to ground. Tube 67' is thus in conductive condition and transmits the standby signal from oscillator 66 to output transformer 46.

It is assumed that, in their initial condition, the doors of both transmitters are closed. When the door of transmitter U is opened for insertion therein of a message blank, relay DOU becomes energized. The energizing circuit therefor may be traced from conductor 201, which is the high side of the AC line, through the tongue and back contact of switch DSU, the winding of relay DOU and conductor 200 to ground. It should be noted that switch DSU, which may correspond to either switch DCS or DCS' of Fig. 1, assumes its illustrated position when the associated transmitter door is opened. When relay DOU operates, it locks up in its operated position though a circuit extending from ground through conductor 200, the winding of relay DOU, contact 6 and armature 5 of relay DOU, contact 1 and armature 2 of relay TU and conductor 201 to the high side of the AC line.

When the door of transmitter U is closed, the tongue of switch DS1U makes with its front contact and switch DS2U is closed. Switch DS2U corresponds to the other one of switches DCS and DCS' of Fig. 1. The closing of switches DS1U and DS2U completes an energizing circuit for relay DCU. This circuit may be traced from conductor 201 through the tongue and front contact of switch DS1U, switch DS2U, armature 2 and contact 3 of relay DOU, the winding of relay DCU and through conductor 200 to ground. When energized, relay DCU locks up through a circuit extending from conductor 201 through tongue 2 and contact 1 of relay EMU, tongue 5 and contact 6 of relay DCU, the winding of relay DCU and conductor 200 to ground.

The windings of door latch magnet DMGU and drum brake magnet DBMU are coupled in parallel with the winding of relay DCU so that these magnets are energized when relay DCU is energized. Magnet DMGU, which is not shown in Fig. 1, serves to lock latch 28 and prevent door 27 from being opened. Magnet DBMU releases a drum brake thereby permitting rotation of the message drum. It will be noted that since door assembly 27 provides the right hand bearing for the message drum, opening of the door while the drum is rotating or rotating the drum while the door is open could seriously damage the message drum. One end of each of windings DMGU and DBMU is grounded through a conductor 202, while the other ends thereof are coupled to the high side of the winding of relay DCU through a conductor 203.

Also coupled in parallel with the winding of relay DCU is the primary winding of exciter lamp transformer 204, the secondary winding of which energizes exciter lamps ELU and BELU. Lamp ELU corresponds to lamp 32 of Fig. 1 while lamp BELU corresponds to lamp 29 of Fig. 1. It is evident that closing the message drum door of transmitter U energizes relay DCU thereby locking the door latch, releasing the drum brake and energizing the signal and blanking photocell exciter lamps.

Energization of relay DCU completes an energizing circuit for selector relay SEL, the circuit extending from ground through conductor 200, the winding of relay SEL, and contact 7 and armature 8 of relay DCL to the high side of the winding of relay DCU. Once energized, relay SEL locks up through contact 6 and armature 5 thereof to the high side of the winding of relay DCU. Accordingly, relay SEL will be energized for the same period as relay DCU.

Energization of relay DCU opens contact 1' and armature 2' thereof, thereby breaking the ground return circuit of conductor 118, rendering tube 67' non-conductive and suppressing transmission of the standby signal.

Conductor 72 of Fig. 6, which may also be considered as conductor 72' of Fig. 11, and conductor 120 of Fig. 8 are connected to contact 4' of relay SEL. Conductor 73 of Fig. 6, which may also be considered as conductor 73' of Fig. 11, and conductor 121 of Fig. 8 are connected to contact 6' of relay SEL. Armature 5' of relay SEL is connected to a source of B+ potential through a conductor 205. It is evident therefore that with relay SEL in its unenergized condition, positive potential will be supplied to conductors 72, 72' and 120 so that tube 40' of Fig. 6 will be disabled, tube 41" of Fig. 11 will be operative and tube 47' of Fig. 8 will be disabled. It must be remembered that in a given installation the arrangements of Figs. 6 and 11 are used in the alternative.

When relay SEL is energized, i. e., when the door of the upper transmitter message drum is closed, positive potential is supplied to conductors 73, 73' and 121, thereby disabling tube 41' of Fig. 6, rendering tube 40" of Fig. 11 operative, and disabling tube 48' of Fig. 8.

When the upper transmitter door is closed, message drum motor DMU, which corresponds to motor 20 of Fig. 1, is energized from the AC supply through a circuit extending from ground potential through conductor 200, contact 1' and armature 2' of relay MSU, the winding of motor DMU, armature 5' and contact 4' of relay MSU and resistor 206 to the high side of the winding of relay DCU. Resistor 206 is a protective resistor designed to limit the motor starting current.

The end of resistor 206 adjacent to contact 4' of relay MSU is connected to one terminal of a rectifier element 207. The other terminal of rectifier 207 is coupled to ground potential through the series combination of a resistor 208 and a capacitor 209. The junction of resistor 208 and capacitor 209 is coupled to ground through a resistor 210, the winding of relay MSU and conductor 200. When motor DMU comes up to speed, current drawn by motor DMU and the consequent voltage drop across resistor 206 decreases sufficiently so that the rectifier 207 produces an operating potential for relay MSU. When relay MSU is operated, motor DMU is supplied with power from a synchronous power amplifier SPAU, the details of which, together with the details of the motor stabilizer circuit and the 60-cycle source, are fully disclosed in the copending application of F. T. Turner et al. referred to hereinbefore. The output of amplifier SPAU is applied to contacts 3' and 6', respectively, of relay MSU so that, when relay MSU is energized, drum motor DMU will be supplied with power from amplifier SPAU. It will be noted that the input to amplifier SPAU is shorted at contact 7' and armature 8' of relay DCU and contact 1 and armature 2 of relay MSU, so that the amplifier is operative solely when both relays DCU and MSU are energized.

When relay MSU is energized, a positive potential is applied to the anode of a glow discharge tube 211. The circuit therefor extends from the anode of tube 211 through the winding of relay TU, contact 6 and armature 5 of relay MSU and through resistor 208 to the positive terminal of rectifier 207. It will be noted that relay TU will not be energized until tube 211 conducts, completing the energizing circuit through the main discharge path of tube 211 and to ground through conductor 202. The starter anode of tube 211 is coupled to ground potential through series connected resistors 212 and 213. The junction of these resistors is coupled to the cathode of tube 211 through a capacitor 214 and to the anode of tube 211 through a resistor 215. Resistor 215 serves as a charging resistor for capacitor 214 so that, when a positive potential is applied to the anode of tube 211, capacitor 214 charges at a rate determined by the time constant of its charging circuit. When sufficient charge is built up on capacitor 214, the potential of the starter anode of tube 211 is great enough to transfer the discharge from the starter anode to the main anode, completing the energizing circuit for relay TU. Upon energization of relay TU, a circuit is completed from the starter anode of tube 211 through resistor 212, a resistor 216, contact 6 and armature 5 of relay TU and through conductor 200 to ground.

Energization of relay TU breaks the locking circuit for relay DOU extending through contact 1 and armature 2 of relay TU. Deenergization of relay DOU completes an energizing circuit for relay PH. This circuit extends from ground through conductor 202, the winding of relay PH, a rectifier 217, contact 1 and armature 2 of relay FAX, armature 2 and contact 3 of relay SEL, contact 3 and armature 2 of relay DCU, contact 1 and armature 2 of relay DOU and through switches DS1U and DS2U to the high side of the AC line. The delay between energization of relay MSU and PH is provided to allow drum motor DMU to synchronize with the driving voltage from amplifier SPNU before beginning transmission.

When relay PH is energized, a ground return circuit for tube 65' of Fig. 7 is completed, thus permitting transmission of the phasing signal from modulator 63' through tube 65' to output transformer 46. The ground return circuit extends from the cathode of tube 65' through conductor 115, contact 3 and armature 2 of relay PH and through conductor 200 to ground.

Energization of relay TU applies B+ to the upper tone generator amplifier, the circuit extending from B+ conductor 205 and through contact 3' and armature 2' of relay TU to the upper tone generator amplifier. Upon application of B+ to this amplifier, motor stabilization as described in the aforementioned patent application of F. T. Turner et al. can occur. It should be noted that the upper and lower tone generators correspond to tone generator 21 of Fig. 1.

When relay PH is energized, an energizing circuit for a timer 218 is completed, the circuit extending from the high side of the AC line through armature 5 and contact 6 of relay PH and through timer 218 to ground. After phasing signals have been transmitted for a predetermined time interval, such as 2.5 seconds, timer 218 closes switch 219, thereby completing an energizing circuit for relay FAX. This latter circuit extends from the high side of the AC line, through switch 219, the winding of relay FAX and conductor 200 to ground.

Energization of relay FAX opens contact 1 and armature 2 thereof, thereby opening the energizing circuit for relay PH. Deenergization of relay PH removes ground from the cathode of tube 65' of Fig. 7 thereby suppressing transmission of the phasing signal. It will be noted that the phasing signal has been transmitted for a time interval determined by the timer adjustment. When relay PH is deenergized the timer energizing circuit through contact 6 and armature 5 thereof is opened, permitting timer 218 to return to its initial condition.

Upon completion of the phasing interval, message transmission from the upper transmitter is to commence. As has been pointed out above, energization of relay SEL rendered tube 47' of Fig. 8 conductive and either tube 40' of Fig. 6 or tube 40'' of Fig. 11 conductive. Prior to energization of relay FAX, message amplifier tube 45' of Fig. 6, or tube 45'' of Fig. 11, lacked a cathode ground return path. Upon energization of relay FAX at the close of the phasing interval, this path is provided, the circuit extending through conductor 99 of Fig. 6 or Fig. 11 and through contact 3' and armature 2' of relay FAX to ground conductor 200. When this ground return path is complete, intelligence signals from the upper transmitter signal photocell may be transmitted to output transformer 46 of Fig. 7.

In order to scan the message blank, the carriage assembly comprising the signal photocell and exciter lamp, as shown at 33 and 34 of Fig. 1, must travel longitudinally along the message drum. This travel is effected by means of a line feed motor LFMU which is energized through a circuit extending from ground conductor 202 through the winding of motor LFMU and contact 3' and armature 2' of relay SEL to the high side of the winding of relay FAX. It should be noted that, upon energization, relay FAX locks up through a circuit extending from ground conductor 200, the winding of relay FAX, contact 6 and armature 5 of relay FAX, contact 4 and armature 5 of relay EML, contact 1 and armature 2 of relay EMU and through conductor 201 to the high side of the AC line. Accordingly, relay FAX will stay energized until either relay EMU or EML is energized.

While the message blank in the upper transmitter is being scanned, the message drum of the lower transmitter may be loaded. In fact, the lower transmitter may be loaded at any time after the upper transmitter door is closed. The first step is opening the door of the lower transmitter and inserting the rolled blank therein. Upon opening the door, relay DOL is energized through a circuit extending from the high side of the AC line through conductor 201, tongue and back contact of door switch DS1L, the winding of relay DOL and through conductor 200 to ground. When energized, relay DOL locks up through a circuit extending from the high side of the AC line through conductor 201, armature 2 and contact 1 of relay TL, armature 5 and contact 6 of relay DOL, the winding of relay DOL and through conductor 200 to ground.

When the door of the lower transmitter is closed, switches DS1L and DS2L assume their operated positions, completing an energizing circuit for relay DCL. This energizing circuit extends from conductor 201 through the tongue and front contact of switch DS1L, switch DS2L, armature 2 and contact 3 of relay DOL and through the winding of relay DCL and conductor 200 to ground. When energized, relay DCL locks up through a circuit extending from ground through conductor 200, the winding of relay DCL, contact 6 and armature 5 of relay DCL, contact 1 and armature 2 of relay EML and conductor 201 to the high side of the AC line.

The windings of door latch magnet DMGL and drum brake magnet DBML are coupled in parallel with the winding of relay DCL so that these magnets are energized when relay DCL is energized. Magnets DMGL and DBML and transformer 220, as well as exciter lamps ELL and BELL, correspond, respectively, to magnets DBMU and DMGU, transformer 204, and lamps ELU and BELU described in connection with the upper transmitter.

Also coupled in parallel with the winding of relay DCL is the primary winding of exciter lamp transformer 220, the secondary winding of which energizes exciter lamps ELL and BELL. It is evident that closing the door of the lower transmitter locks the door latch, releases the drum brake and energizes the signal and blanking photocell exciter lamps.

When relay DCL is energized, an energizing circuit for drum motor DML is completed. This circuit extends from ground through conductor 200, contact 1' and armature 2' of relay MSL, the winding of drum motor DML, armature 5' and contact 4' of relay MSL and resistor 221 to the high side of the winding of relay DCL. Resistor 221 is a protective resistor designed to limit the starting current of motor DML. Contact 4' of relay MSL is connected to one terminal of a rectifier element 222, the other terminal of which is coupled to ground potential through the series combination of a resistor 223 and a capacitor 224. The junction of resistor 223 and capacitor 224 is coupled to ground potential through a resistor 225, the winding of relay MSL and conductor 200.

When drum motor DML comes up to speed, the current drawn by motor DML and the consequent voltage drop across resistor 221 decrease sufficiently so that rectifier 222 produces an operating potential for relay MSL.

The output terminals of a synchronous power amplifier SPAL are connected to contacts 3' and 6', respectively, of relay MSL so that, when relay MSL is energized due to the rising speed of motor DML, motor DML becomes energized from amplifier SPAL rather than from the A. C. line. The input to synchronous power amplifier SPAL is shorted at contact 7' and armature 8' of relay DCL and contact 1 and armature 2 of relay MSL so that the amplifier is operative solely when relays DCL and MSL are energized.

When relay MSL is energized, a positive potential is applied to the anode of a glow discharge tube 226 through a circuit extending from the positive terminal of rectifier 222 through resistor 223, armature 5 and contact 6 of relay MSL, and the winding of relay TL to the anode of tube 226. The cathode of tube 226 is connected to ground and, through a capacitor 227, to the junction of series connected resistors 228 and 229 intercoupling the starter anode of tube 226 and ground. The junction of resistors 228 and 229 is coupled to the anode of tube 226 through a charging resistor 230 and to ground through a resistor 231, contact 6 and armature 5 of relay TL and conductor 200. When the positive potential is applied to the anode of tube 226, a charging current for capacitor 227 flows through resistor 230. After a predetermined time interval dependent on the time constant of the charging circuit, the charge on capacitor 227 will raise the potential of the starter anode of tube 226 sufficiently to initiate the main discharge, thereby completing the energizing circuit for relay TL.

Energization of relay TL causes application of B+ potential to the tone generator amplifier of the lower transmitter. The circuit therefor extends from B+ through conductor 205, and contact 3' and armature 2' of relay TL to the lower tone generator amplifier.

At any time after closing the door of the upper transmitter, a message blank may be inserted in the lower transmitter. When the door of the lower transmitter is closed, the sequence of operations just described will occur. After relay TL is energized, applying B+ to the lower tone generator amplifier, the lower transmitter will run idle until transmission of the message in the upper transmitter is completed.

At the end of the message on the upper transmitter, as determined by the setting on the end-of-message pointer of the upper transmitter, corresponding to pointer P of Fig. 1, switch EMSU, corresponding to switch EMS of Fig. 1, will be closed, thereby completing an energizing circuit for relay EMU. This circuit extends from the high side of the A. C. line through conductor 201, switch EMSU, the winding of relay EMU and conductor 200 to ground.

When relay EMU is operated, a ground return path for tube 67' of Fig. 7 is completed, thereby applying the end-of-message tone from oscillator 66 to output transformer 64. This ground return path extends from the cathode of tube 67' through conductor 118, contact 6 and armature 5 of relay EMU and through conductor 200 to ground.

It will be noted that energization of relay EMU opens contact 1 and armature 2 thereof, thereby opening the energizing circuit for relay DCU. Reenergization of relay DCU results in deenergization of relays SEL, TU, FAX and MSU, door latch magnet DMGU, drum brake magnet DBMU, and exciter lamps ELU and BELU, each of which is energized in parallel with relay DCU. Deenergization of relay MSU opens contacts 6' and 3' thereof, removing driving voltage from drum motor DMU. Deenergization of relay FAX removes driving voltage from line feed motor LFMU, stopping forward travel of the upper transmitter carriage.

Deenergization of relay DCU closes an energizing circuit for a half-nut solenoid SU thereby releasing a carriage return spring and causing the carriage to return to its initial position. The energizing circuit for solenoid SU extends from the high side of the A. C. line through switches DS1U and DS2U, armature 2 and contact 1 of relay DOU, armature 2 and contact 1 of relay DCU, a switch SSU, the winding of solenoid SU and conductor 202 to ground. As soon as the carriage starts to return, switch EMSU opens, thereby opening the energizing circuit for relay EMU and suppressing transmission of the end-of-message tone by opening the ground return path for tube 67'. Since a very short time is required for the carriage to commence its return trip, the end-of-message signal will be transmitted for a very short interval. If the lower transmitter had not been loaded, the ground return path for tube 67' would be maintained through contact 1' and armature 2' of relay DCL and contact 1' and armature 2' of relay DOL, resulting in transmission of the standby signal. When the carriage returns to its initial position, a stop arm thereon operates switch SSU thereby opening the energizing circuit for solenoid SU.

Deenergization of relays SEL and FAX at the end of the message in the upper transmitter completes an energizing circuit for relay PH extending from ground through conductor 202, the winding of relay PH, rectifier 217, contact 1 and armature 2 of relay FAX, armature 2 and contact 1 of relay SEL, contact 3 and armature 2 of relay DCL, contact 1 and armature 2 of relay DOL, switches DS2L and DS1L and conductor 201 to the high side of the AC line.

Energization of relay PH again closes the ground return circuit through conductor 115 for tube 65' of Fig. 7, thereby permitting application of the phasing signal from oscillator 64 to transformer 46. While it may appear from the foregoing description that phasing signals and end-of-message signals are transmitted concurrently, actually this is not the case. To prevent concurrent transmission, the resistance-capacitance network in the cathode circuit of tube 67' is given a short time constant while the resistance-capacitance network in the cathode circuit of tube 65' is given a long time constant. As a result, tube 67' will be cut off by the opening of switch EMSL before tube 65' transmits a phasing impulse.

Energization of relay PH closes armature 5 and contact 6 thereof thereby applying AC line voltage to timer 218. Upon completion of the timer cycle, timer 218 operates switch 219, again completing the energizing circuit for relay FAX. When energized, relay FAX locks up through the same circuit described in connection with the upper transmitter.

Operation of relay FAX opens the energizing circuit for relay PH, thereby opening the ground return circuit for tube 65' of Fig. 7 and suppressing transmission of phasing impulses. Operation of relay FAX also closes the cathode ground return circuit of tube 45' of Fig. 6 or tube 45" of Fig. 11 as described hereinbefore. Accordingly, facsimile signals from the lower transmitter may be transmitted to transformer 46. In this connection, it should be noted that relay SEL is deenergized so that conductors 120 and 72 or 72' are connected through contact 4' and armature 5' thereof to the B+ supply. As a result, tubes 40' and 41' of Fig. 6 will be in their non-conductive and conductive conditions, respectively, or, if the arrangement of Fig. 11 is employed, tubes 40" and 41" will be in their non-conductive and conductive conditions, respectively. Similarly, tubes 47' and 48' of Fig. 8 will be in their non-conductive and conductive conditions, respectively.

Energization of relay FAX with relay SEL deenergized produces energization of the lower transmitter line feed motor LFML because motor LFML is connected in parallel with relay FAX through a circuit extending from ground through conductor 202, the winding of motor LFML, and contact 1' and armature 2' of relay SEL to the high side of the winding of relay FAX.

The message blank in the lower transmitter is scanned and facsimile signals are transmitted until end-of-message switch EMSL is closed as the carriage reaches the end-of-message pointer P of Fig. 1.

Closing of switch EMSL completes an energizing circuit for relay EML, the circuit extending from the high side of the AC line through switch EMSL, the winding of relay EML and conductor 200 to ground. Energization of relay EML completes a ground return path for tube 67' of Fig. 7 extending from the cathode of tube 67' through conductor 118, contact 3' and armature 2' of relay EML and conductor 260 to ground. Upon completion of the ground return path for tube 67', the output of oscillator 66 is applied to transformer 46.

Energization of relay EML opens the energizing circuits for relays DCL, TL, MSL and FAX, line feed motor LFML, drum motor DML, door latch magnet DMGL, brake magnet DBML and exciter lamps ELL and BELL. It should be noted that a small time delay may occur before relay MSL becomes deenergized because of the charge on capacitor 224. A similar delay may occur in the deenergization of relay MSU because of the charge on capacitor 209.

Deenergization of relay DCL completes an energizing circuit for a solenoid SL extending from ground through conductor 202, a switch SSL, solenoid SL, contact 1 and armature 2 of relay DCL, contact 1 and armature 2 of relay DOL, switches DS2L and DS1L and conductor 201 to the high side of the AC line. Energization of solenoid SL releases the carriage to permit the return spring to return the carriage to its initial position. When the carriage reaches its initial position, a stop arm thereon operates switch SSL opening the energizing circuit for relay SL.

As soon as the carriage starts its return trip, switch EMSL opens, thereby opening the energizing circuit for relay EML. If the upper transmitter has been loaded and is running idle, the ground return path for tube 67' of Fig. 7 will be broken, transmission of the end-of-message signal will be terminated, and an operating cycle for the upper transmitter will commence. If the upper transmitter has not been loaded, transmission of the standby signal by tube 67' will continue, the ground return path being made in the same manner as when power was initially turned on, namely, through contact 1' and armature 2' of relay DCL and contact 1' and armature 2' of relay DCU. It should be noted that the end-of-message signal and the standby signal are derived from the same source, the difference therebetween being that the end-of-message signal is of short duration while the duration of the standby signal is indefinite.

A push button switch PBL is connected between the high side of relay FAX winding and ground, the circuit including the winding of relay EML, so that this button may be closed during message transmission to initiate the end-of-message sequence of operations. A similar switch PBU is provided for the upper transmitter.

If desired, the lower transmitter may be loaded before the upper transmitter. In this event the sequence of operations described for the lower transmitter occurs before those for the upper transmitter. Similarly, either transmitter may be operated without loading the other, in which event all relays return to their unoperated positions at the end of each cycle of operations.

It is to be understood that the mechanical apparatus disclosed in Figs. 1, 1A and 3 does not form a part of the present invention but forms a part of the invention disclosed in the copending patent application of L. G. Pollard, Serial No. 274,174, filed February 29, 1952, now Patent No. 2,695,925, issued November 30, 1954.

While the invention has been described in a particular use thereof and in particular embodiments, it is not desired that it be limited thereto, for obvious modifications thereof will occur to those skilled in the art without departing from the spirit and scope of the invention as set forth in the appended claims. The various values of frequency, voltage and the like, given in the specification, are intended solely for illustration and are not to be considered as limiting the invention.

What is claimed is:

1. Facsimile transmission apparatus, comprising scanning means for scanning a rolled transmitting blank having the subject matter to be transmitted delineated thereon thereby to produce a facsimile signal and in which the adjacent edges of the rolled blank are spaced from each other by a longitudinal gap, and including means operative periodically to produce a generally rectangular electrical impulse having a time duration determined by the width of the gap between the adjacent edges of said transmitting blank, a flip-flop circuit having a normal condition and an operated condition, means responsive to the leading edge of said electrical impulse to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, a one-shot multivibrator circuit for generating a generally rectangular output pulse having a predetermined time duration, means responsive to the trailing edge of said electrical impulse to trigger said multivibrator thereby to produce said output pulse, said output pulse having a leading edge substantially coincident in time with the trailing edge of said electrical impulse and a trailing edge occurring said predetermined time thereafter, means responsive to the trailing edge of said output pulse to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said blanking modulator circuit thereby to apply said facsimile signal to said output circuit, means to apply said rectangular blanking pulse to said blanking modulator circuit to suppress transmission of said facsimile signal from a time corresponding to the leading edge of said electrical impulse to said predetermined time after the trailing edge thereof, a source of a phasing wave, a normally non-conductive phasing modulator intercoupling said source and said output circuit, and means to apply the output pulse of said multivibrator to said phasing modulator to render said phasing modulator conductive during said predetermined time.

2. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a time duration determined by the width of the gap between the adjacent edges of said transmitting blank, a flip-flop circuit having a normal condition and an operated condition, means responsive to the leading edge of said electrical impulse to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, a one-shot multivibrator circuit for generating a generally rectangular output pulse having a predetermined time duration, means responsive to the trailing edge of said electrical impulse to trigger said multivibrator thereby to produce said output pulse, said output pulse having a leading edge substantially coincident in time with the trailing edge of said electrical impulse and a trailing edge occurring said predetermined time thereafter, means responsive to the trailing edge of said output pulse to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said blanking modulator circuit thereby to apply said facsimile signal to said output circuit, means to apply said rectangular blanking pulse to said blanking modulator circuit to suppress transmission of said facsimile signal from a time corresponding to the leading edge of said electrical impulse to said predetermined time after the trailing edge thereof, a source of a phasing wave, a normally non-conductive phasing modulator intercoupling said source and said output circuit, and means to apply the output pulse of said multivibrator to said phasing modulator to render said phasing modulator conductive during said predetermined time.

3. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a time duration determined by the width of the gap between the adjacent edges of said transmitting blank, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said blanking modulator circuit thereby to apply said facsimile signal to said output circuit, means to apply said rectangular blanking pulse to said blanking modulator circuit to suppress transmission of said facsimile signal from a time corresponding to the leading edge of said electrical impulse to said predetermined time after the trailing edge thereof, a source of a phasing wave, a normally non-conductive phasing modulator intercoupling said source and said output circuit, and means to apply the output pulse of said multivibrator to said phasing modulator to render said phasing modulator conductive during said predetermined time.

4. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a time duration determined by the width of the gap between the adjacent edges of said transmitting blank, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said blanking modulator circuit thereby to apply said facsimile signal to said output circuit, and means to apply said rectangular blanking pulse to said blanking modulator circuit to supress transmission of said facsimile signal from a time corresponding to the leading edge of said electrical impulse to said predetermined time after the trailing edge thereof.

5. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a circular section of said transmitting blank thereby periodically to produce a generally rectangular electrical impulse having a time duration determined by the width of the gap between the adjacent edges of said transmitting blank, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said blanking modulator circuit thereby to apply said facsimile signal to said output circuit, means to apply said rectangular blanking pulse to said blanking modulator circuit to suppress transmission of said facsimile signal from a time corresponding to the leading edge of said electrical impulse to said predetermined time after the trailing edge thereof, a source of a phasing wave, a normally non-conductive phasing modulator intercoupling said source and said output circuit, and means to apply the output pulse of said multivibrator to said phasing modulator to render said phasing modulator conductive during said predetermined time.

6. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a circular section of said transmitting blank thereby periodically to produce a generally rectangular electrical impulse having a time duration proportional to the width of the gap between the adjacent edges of said transmitting blank, said electrical impulse having a leading edge occurring at a time substantially coincident with scanning by said second scanning means of the leading edge of the gap in said circular section and a trailing edge occurring at a time substantially coincident with scanning by said second scanning means of the trailing edge of the gap in said circular section, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a blanking modulator circuit, an output circuit coupled to said blanking modulator circuit, means to apply said facsimile signal to said output circuit, and means to apply said rectangular blanking pulse to said blanking modulator circuit to suppress transmission of said facsimile signal from a time corresponding to the leading edge of said electrical impulse to said predetermined time after the trailing edge thereof.

7. Facsimile transmission apparatus, comprising scanning means for scanning a rolled transmitting blank having the subject matter to be transmitted delineated thereon thereby to produce a facsimile signal and in which the adjacent edges of the rolled blank are spaced from each other by a longitudinal gap, and including means operative periodically to produce an electrical impulse having a first time duration determined by the width of the gap between the adjacent edges of said transmitting blank, an output circuit, normally conductive modulator means for applying said facsimile signal to said output circuit, means responsive to said electrical impulse for generating a blanking impulse having a second time duration including said first time duration, and means to apply said blanking impulse to said modulator thereby to render said modulator non-conductive for a time interval substantially coextensive with said second time duration.

8. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a first time duration determined by the width of the gap between the adjacent edges of said transmitting blank, an output circuit, normally conductive modulator means for applying said facsimile signal to said output circuit, means responsive to said electrical impulse for generating a blanking impulse having a second time duration including said first time duration, and means to apply said blanking impulse to said modulator thereby to render said modulator non-conductive for a time interval substantially coextensive with said second time duration.

9. Facsimile transmission apparatus, comprising first scanning means for scanning a rolled transmitting blank having a longitudinal gap therein and having the subject matter to be transmitted delineated thereon thereby to produce a facsimile signal and in which the adjacent edges of the rolled blank are spaced from each other by a longitudinal gap, second scanning means for scanning a circular section of said transmitting blank thereby periodically to produce a generally rectangular electrical impulse having a first time duration determined by the width of the gap between the adjacent edges of said transmitting blank and having a leading edge occurring at a time substantially coincident with scanning by said second scanning means of the leading edge of the gap in said circular section, an output circuit, normally conductive modulator means for applying said facsimile signal to said output circuit, means responsive to said electrical impulse for generating a generally rectangular blanking impulse having a second time duration including said first time duration, and means to apply said blanking impulse to said modulator thereby to render said modulator non-conductive for a time interval substantially coextensive with said second time duration and including the interval of scanning by said first scanning means of the gap in said transmitting blank.

10. Facsimile transmission apparatus, comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a circular section of said transmitting blank thereby to produce once each revolution of said drum a generally rectangular electrical impulse having a first time duration determined by the width of the gap between the adjacent edges of said transmitting blank and having a leading edge occurring at a time substantially coincident with scanning by said second scanning means of the leading edge of the gap in said circular section, an output circuit, normally conductive modulator means for applying said facsimile signal to said output circuit, means responsive to said electrical impulse for generating a generally rectangular blanking impulse having a second time duration including said first time duration, and means to apply said blanking impulse to said modulator thereby to render said modulator non-conductive for a time interval substantially coextensive with said second time duration and including the interval of scanning by said first scanning means of the gap in said transmitting blank.

11. Facsimile transmission apparatus, comprising scanning means for scanning a rolled transmitting blank having the subject matter to be transmitted delineated thereon thereby to produce a facsimile signal and in which the adjacent edges of the rolled blank are spaced from each other by a longitudinal gap, and including means operative periodically to produce a generally rectangular electrical impulse having a time duration determined by the width of the gap between the adjacent edges of said transmitting blank, a source of a phasing wave, an output circuit, normally non-conductive modulator means intercoupling said source and said output circuit, means responsive to an edge of said electrical impulse for generating a phasing control impulse having a predetermined time duration, and means to apply said phasing control impulse to said modulator thereby to render said modulator conductive and to permit transmission of said phasing wave to said output circuit for a time interval substantially coextensive with the duration of said phasing control impulse.

12. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a time duration determined by the width of the gap between the adjacent edges of said transmitting blank, a source of a phasing wave, an output circuit, normally non-conductive modulator means intercoupling said source and said output circuit, means responsive to an edge of said electrical impulse for generating a phasing control impulse having a predetermined time duration, and means to apply said phasing control impulse to said modulator thereby to render said modulator conductive and to permit transmission of said phasing wave to said output circuit for a time interval substantially coextensive with the duration of said phasing control impulse.

13. Facsimile transmission apparatus, comprising first scanning means for scanning a rolled transmitting blank having a longitudinal gap therein and having the subject matter to be trasmitted delineated thereon thereby to produce a facsimile signal and in which the adjacent edges of the rolled blank are spaced from each other by a longitudinal gap, second scanning means for scanning a circular section of said transmitting blank thereby periodically to produce a generally rectangular electrical impulse having a time duration determined by the width of the gap between the adjacent edges of said transmitting blank and having a leading edge occurring at a time substantially coincident with scanning by said second scanning means of the leading edge of the gap in said circular section, a source of a phasing wave, an output circuit, normally non-conductive modulator means intercoupling said source and said output circuit, means responsive to an edge of said electrical impulse for generating a phasing control impulse having a predetermined time duration, and means to apply said phasing control impulse to said modulator thereby to render said modulator conductive and to permit transmission of said phasing wave to said output circuit for a time interval substantially coextensive with the duration of said phasing control impulse.

14. Facsimile transmission apparatus, comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a circular section of said transmitting blank thereby to produce once each revolution of said drum a generally rectangular electrical impulse having a time duration determined by the width of the gap between the adjacent edges of said transmitting blank and having a leading edge occurring at a time substantially coincident with scanning by said second scanning means of the leading edge of the gap in said circular section, a source of a phasing wave, an output circuit, normally non-conductive modulator means intercoupling said source and said output circuit, means responsive to the trailing edge of said electrical impulse for generating a generally rectangular phasing control impulse having a predetermined time duration, and means to apply said phasing control impulse to said modulator thereby to render said modulator conductive and to permit transmission of said phasing wave to said output circuit for a time interval substantially coextensive with the duration of said phasing control impulse.

15. Facsimile transmission apparatus, comprising scanning means for scanning a rolled transmitting blank having the subject matter to be transmitted delineated thereon thereby to produce a facsimile signal and in which the adjacent edges of the rolled blank are spaced from each other by a longitudinal gap, and including means operative periodically to produce a generally rectangular electrical impulse having a first time duration determined by the width of the gap between the adjacent edges of said transmitting blank, an output circuit, normally conductive modulator means for applying said facsimile signal to said output circuit, means responsive to said electrical impulse for generating a blanking impulse having a second time duration determined by and including said first time duration, means to apply said blanking impulse to said normally conductive modulator thereby to render said normally conductive modulator non-conductive for a time interval substantially coextensive with said second time duration, a source of a phasing wave, normally non-conductive modulator means intercoupling said source and said output circuit, means responsive to an edge of said electrical impulse for generating a phasing control impulse having a predetermined time duration, and means to apply said phasing control impulse to said normally non-conductive modulator to render said normally non-conductive modulator conductive and to permit transmission of said phasing wave to said output circuit for a time interval substantially coextensive with the duration of said phasing control impulse.

16. Facsimile transmission apparatus, comprising first scanning means for scanning a rolled transmitting blank having the subject matter to be transmitted delineated thereon thereby to produce a facsimile signal and in which the adjacent edges of the rolled blank are spaced from each other by a longitudinal gap, second scanning means for scanning a portion of said transmitting blank thereby periodically to produce a generally rectangular electrical impulse having a first time duration determined by the width of the gap between the adjacent edges of said transmitting blank, an output circuit, normally conductive modulator means for applying said facsimile signal to said output circuit, means responsive to said electrical impulse for generating a blanking impulse having a second time duration determined by and including said first time duration, means to apply said blanking impulse to said normally conductive modulator thereby to render said normally conductive modulator non-conductive for a time interval substantially coextensive with said second time duration, a source of a phasing wave, normally non-conductive modulator means intercoupling said source and said output circuit, means responsive to an edge of said electrical impulse for generating a phasing control impulse having a predetermined time duration, and means to apply said phasing control impulse to said normally non-conductive modulator to render said normally non-conductive modulator conductive and to permit transmission of said phasing wave to said output circuit for a time interval substantially coextensive with the duration of said phasing control impulse.

17. Facsimile transmission apparatus, comprising first scanning means for scanning a rolled transmitting blank having the adjacent edges thereof spaced from each other by a longitudinal gap and having the subject matter to be transmitted delineated thereon thereby to produce a facsimile signal, second scanning means for scanning a circular section of said transmitting blank thereby periodically to produce a generally rectangular electrical impulse having a first time duration determined by the width of the gap between the adjacent edges of said transmitting blank and having a leading edge occurring at a time substantially coincident with scanning by said second scanning means of the leading edge of the gap in said circular section, an output circuit, normally conductive modulator means for applying said facsimile signal to said output circuit, means responsive to said electrical impulse for generating a blanking impulse having a second time duration including said first time duration, means to apply said blanking impulse to said normally conductive modulator thereby to render said normally conductive modulator nonconductive for a time interval substantially coextensive with said second time duration and including the interval of scanning by said first scanning means of the gap in said transmitting blank, a source of a phasing wave, normally nonconductive modulator means intercoupling said source and said output circuit, means responsive to an edge of said electrical impulse for generating a phasing control impulse having a predetermined time duration, and means to apply said phasing control impulse to said normally nonconductive modulator to render said normally nonconductive modulator conductive and to permit transmission of said phasing wave to said output circuit for a time interval substantially coextensive with the duration of said phasing control impulse.

18. Facsimile transmission apparatus, comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a circular section of said transmitting blank thereby to produce once each revolution of said drum a generally rectangular electrical impulse having a first time duration determined by the width of the gap between the adjacent edges of said transmitting blank and having a leading edge and a trailing edge occurring, respectively, at times substantially coincident with the scanning by said second scanning means of the leading and trailing edges, respectively, of the gap in said circular section, an output circuit, normally conductive modulator means for applying said facsimile signal to said output circuit, means responsive to said electrical impulse for generating a blanking impulse having a second time duration including said first time duration, means to apply said blanking impulse to said normally conductive modulator thereby to render said normally conductive modulator nonconductive for a time interval substantially coextensive with said second time duration, a source of a phasing wave, normally nonconductive modulator means intercoupling said source and said output circuit, means responsive to the trailing edge of said electrical impulse for generating a phasing control impulse having a predetermined time duration, and means to apply said phasing control impulse to said normally nonconductive modulator to render said normally nonconductive modulator conductive and to permit transmission of said phasing wave to said output circuit for a time interval substantially coextensive with the duration of said phasing control impulse.

19. Facsimile transmission apparatus comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a generally circular section of said transmitting blank thereby to produce a generally rectangular electrical impulse once each revolution of said drum, said electrical impulse having a leading edge substantially coincident with scanning by said second scanning means of the leading edge of the gap in said circular section and a trailing edge substantially coincident with scanning by said second scanning means of the trailing edge of the gap in said circular section, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a normally conductive blanking modulator circuit, an output circuit coupled to said blanking modulator circuit, means to apply said facsimile signal to said blanking modulator circuit thereby to apply said facsimile signal to said output circuit, means to apply said blanking pulse to said blanking modulator circuit to suppress transmission of said facsimile signal from a time corresponding to the leading edge of said electrical impulse to said predetermined time after the trailing edge thereof, a source of a phasing wave, a normally nonconductive phasing modulator intercoupling said source and said output circuit, and means to apply the output pulse of said multivibrator to said phasing modulator to render said phasing modulator conductive during said predetermined time interval.

20. Facsimile transmission apparatus comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a generally circular section of said transmitting blank thereby to produce a generally rectangular electrical impulse once each revolution of said drum, said electrical impulse having a leading edge substantially coincident with scanning by said second scanning means of the leading edge of the gap in said circular section and a trailing edge substantially coincident with scanning by said second scanning means of the trailing edge of the gap in said circular section, a first differentiating network, means to apply said electrical impulse to said first differentiating network thereby to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, a second differentiating network, means to apply said electrical impulse to said second differentiating network thereby to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, a third differentiating network, means to apply said output pulse to said third differentiating network thereby to produce a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a normally conductive blanking modulator circuit, an output circuit coupled to said blanking modulator circuit, means to apply said facsimile signal to said blanking modulator circuit thereby to apply said facsimile signal to said output circuit, means to apply said blanking pulse to said blanking modulator circuit to suppress transmission of said facsimile signal from a time corresponding to the leading edge of said electrical impulse to said predetermined time after the trailing edge thereof, a source of a phasing wave, a normally nonconductive phasing modulator intercoupling said source and said output circuit, and means to apply the output pulse of said multivibrator to said phasing modulator to render said phasing modulator conductive during said predetermined time interval.

21. Facsimile transmission apparatus comprising a rotatable cylindrical transparent drum member for holding therein a rolled transmitting blank having the subject matter to be transmitted delineated thereon, said transmitting blank having the adjacent edges thereof spaced from each other by a gap extending longitudinally along said drum, first optical scanning means for scanning said transmitting blank thereby to produce a facsimile signal, second optical scanning means for scanning a generally circular section of said transmitting blank thereby to produce a generally rectangular electrical impulse once each revolution of said drum, said electrical impulse having a leading edge substantially coincident with scanning by said second scanning means of the leading edge of the gap in said circular section and a trailing edge substantially coincident with scanning by said second scanning means of the trailing edge of the gap in said circular section, said first and second optical scanning means being arranged relative to each other so that circular scanning by said second scanning means leads circular scanning by said first scanning means by a given distance, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a normally conductive blanking modulator circuit, an output circuit coupled to said blanking modulator circuit, means to apply said facsimile signal to said blanking modulator circuit thereby to apply said facsimile signal to said output circuit, means to apply said blanking pulse to said blanking modulator circuit to suppress transmission of said facsimile signal from a time corresponding to the leading edge of said electrical impulse to said predetermined time after the trailing edge thereof, a source of a phasing wave, a normally nonconductive phasing modulator intercoupling said source and said output circuit, and means to apply the output pulse of said multivibrator to said phasing modulator to render said phasing modulator conductive during said predetermined time interval.

22. Facsimile transmission apparatus comprising a rotatable cylindrical drum member for holding therein a rolled transmitting blank having the subject matter to be transmitted delineated thereon, said transmitting blank having the adjacent edges thereof spaced from each other by a gap extending longitudinally along said drum, first scanning means for scanning said transmitting blank thereby to produce a facsimile signal, second scanning means for scanning a generally circular section of said transmitting blank thereby to produce a generally rectangular electrical impulse once each revolution of said drum, said electrical impulse having a leading edge substantially coincident with scanning by said second scanning means of the leading edge of the gap in said circular section and a trailing edge substantially coincident with scanning by said second scanning means of the trailing edge of the gap in said circular section, means responsive to said electrical impulse to produce a first voltage peak at a time substantially coincident with the leading edge of said electrical impulse, a flip-flop circuit having a normal condition and an operated condition, means to apply said first voltage peak to said flip-flop circuit to trigger said flip-flop circuit from said normal condition to said operated condition thereof thereby to produce at the output of said flip-flop circuit the leading edge of a generally rectangular blanking pulse at a time substantially coincident with the leading edge of said electrical impulse, means responsive to said electrical impulse to produce a second voltage peak at a time substantially coincident with the trailing edge of said electrical impulse, a one-shot multivibrator circuit for generating a generally rectangular output pulse having a predetermined time duration, means to apply said second voltage peak to said multivibrator thereby to produce said output pulse, said output pulse having a leading edge substantially coincident in time with the trailing edge of said electrical impulse and a trailing edge occurring said predetermined time thereafter, means to derive from said output pulse a third voltage peak at a time substantially coincident with the trailing edge of said output pulse, means to apply said third voltage peak to said flip-flop circuit to trigger said flip-flop circuit from said operated condition thereof to said normal condition thereof thereby to produce the trailing edge of said rectangular blanking pulse, a normally conductive blanking modulator circuit, an output circuit coupled to said blanking modulator circuit, means to apply said facsimile signal to said blanking modulator circuit thereby to apply said facsimile signal to said output circuit, and means to apply said blanking pulse to said blanking modulator circuit to suppress transmission of said facsimile signal from a time corresponding to the leading edge of said electrical impulse to said predetermined time after the trailing edge thereof.

23. Facsimile transmission apparatus, comprising a facsimile transmitter including a rotatable generally cylindrical message drum for holding a rolled transmitting blank having the subject matter to be transmitted delineated thereon, first scanning means for scanning said transmitting blank to produce a facsimile signal, said first scanning means including a linearly movable carriage having an initial position, second scanning means for scanning a generally circular section of said transmitting blank to produce a phasing impulse having a given duration once each revolution of said transmitting blank and an electric motor for rotating said message drum at a given speed, an output circuit, a source of standby tone normally coupled to said output circuit, a source of driving voltage, means operable upon insertion of a transmitting blank in said message drum for connecting said motor to said source of driving voltage and for decoupling said source of standby tone from said output circuit, a source of a phasing wave, a normally nonconductive modulator, means to apply said phasing impulses to said modulator to render said modulator conductive during the duration of said phasing impulses, means responsive to assumption of said given speed by said motor to couple said first modulator to said output circuit for a predetermined time interval, means operative upon completion of said predetermined time interval to produce movement of said carriage thereby to produce scanning of said transmitting blank by said first scanning means and to apply said facsimile signal to said output circuit, and means operative upon completion of scanning of said transmitting blank by said first scanning means to disconnect said motor from said driving voltage source, to return said carriage to said initial position thereof and momentarily to apply an end-of-message tone to said output circuit.

24. Facsimile transmission apparatus, comprising a pair of facsimile transmitters each having message apparatus for holding a transmitting blank having the subject matter to be transmitted delineated thereon, first scanning means for scanning said transmitting blank to produce a facsimile signal and second scanning means for scanning a portion of said transmitting blank thereby periodically to produce a phasing impulse having a given duration, an output circuit, a source of a standby tone normally coupled to said output circuit, means operative upon insertion of a transmitting blank in the message apparatus of one of said transmitters for decoupling said source of standby tone from said output circuit, a source of a phasing wave, a normally nonconductive modulator, means to apply the phasing impulses from said one transmitter to said modulator to render said modulator conductive during the duration of said phasing impulses, means operative a given time interval after insertion of a transmitting blank in the message apparatus of said one transmitter to couple said modulator to said output circuit for a predetermined time interval, means operative upon completion of said predetermined time interval to apply the facsimile signal from said one transmitter to said output circuit and to initiate scanning by the associated first scanning means of the transmitting blank in said one transmitter, means operative upon completion of scanning by said first scanning means of the transmitting blank in said one transmitter momentarily to apply an end-of-message tone to said output circuit, means responsive to said completion of scanning of said one transmitter and to the loading of a transmitting blank in the message apparatus of the other transmitter to apply the phasing impulses from said other transmitter to said modulator to render said modulator conductive during the duration of said phasing impulses and to couple said modulator to said output circuit for said predetermined time interval, and means operative upon completion of said latter predetermined time interval to apply the facsimile signal from said other transmitter to said output circuit and to initiate scanning by the associated first scanning means of the transmitting blank in said other transmitter.

25. Facsimile transmission apparatus, comprising a pair of facsimile transmitters each having a rotatable generally cylindrical message drum for holding a rolled transmitting blank having the subject matter to be transmitted delineated thereon and having the adjacent edges thereof spaced from each other by a gap extending longitudinally along the message drum, first scanning means for scanning said transmitting blank to produce a facsimile signal, said first scanning means including a carriage linearly movable along the message drum and having an initial position, second scanning means for scanning a generally circular section of said transmitting blank to produce a phasing impulse having a given duration once each revolution of said transmitting blank and an electric motor for rotating said message drum at a given speed, an output circuit, a source of a standby tone normally coupled to said output circuit, a source of driving voltage, means operable upon insertion of a transmitting blank in the message drum of one of said transmitters for connecting the associated motor to said source of driving voltage and for decoupling said source of standby tone from said output circuit, a source of a phasing wave, a normally nonconductive modulator, means to apply the phasing impulses from said one transmitter to said modulator to render said modulator conductive during the duration of said phasing impulses, means responsive to the assumption of said given speed by said motor to couple said modulator to said output circuit for a predetermined time interval, means operative upon completion of said predetermined time interval to apply the facsimile signal from said one transmitter to said output circuit and to produce linear movement of the carriage of said one transmitter along the associated message drum thereby to produce scanning of the transmitting blank by the associated first scanning means, means operative upon completion of scanning by said first scanning means of the transmitting blank in said one transmitter to disconnect the associated motor from said driving voltage source, to return the associated carriage to the initial position thereof and momentarily to apply an end-of-message tone to said output circuit, means responsive to said completion of scanning of said one transmitter and to the loading of a transmitting blank in the message drum of the other transmitter to apply the phasing impulses from said other transmitter to said modulator to render said modulator conductive during the duration of said phasing impulses and to couple said modulator to said output circuit for said predetermined time interval, and means operative upon completion of said latter predetermined time interval to apply the facsimile signal from said other transmitter to said output circuit and to produce linear movement of the carriage of said other transmitter along the associated message drum thereby to produce scanning of the transmitting blank in said other transmitter by the associated first scanning means.

26. Facsimile transmission apparatus, comprising a pair of facsimile transmitters each having a rotatable generally cylindrical message drum for holding a rolled transmitting blank having the subject matter to be transmitted delineated thereon and having the adjacent edges thereof spaced from each other by a gap extending longitudinally along the message drum, first scanning means for scanning said transmitting blank to produce a facsimile signal, said first scanning means including a carriage linearly movable along the message drum and having an initial position, second scanning means for scanning a generally circular section of said transmitting blank to produce a phasing impulse having a given duration once each revolution of said transmitting blank and an electric motor for rotating said message drum at a given speed, an output circuit, a source of a standby tone normally coupled to said output circuit, a source of starting driving voltage, a source of regulated driving voltage, means operable upon insertion of a transmitting blank in the message drum of one of said transmitters for connecting the associated motor to said source of starting driving voltage and for decoupling said source of standby tone from said output circuit, a source of a phasing wave, normally nonconductive modulator, means to apply the phasing impulses from said one transmitter to said modulator to render said modulator conductive during the duration of said phasing impulses, means responsive to the assumption of said given speed by said motor to couple said modulator to said output circuit for a predetermined time interval, and to couple said motor to said source of regulated driving voltage, means operative upon completion of said predetermined time interval to apply the facsimile signal from said one transmitter to said output circuit and to produce linear movement of the carriage of said one transmitter along the associated message drum thereby to produce scanning of the transmitting blank by the associated first scanning means, means operative upon completion of scanning by said first scanning means of the transmitting blank in said one transmitter to disconnect the associated motor from said regulated driving voltage source, to return the associated carriage to the initial position thereof and momentarily to apply an end-of-message tone to said output circuit, means responsive to said completion of scanning of said one transmitter and to the loading of a transmitting blank in the message drum of the other transmitter to apply the phasing impulses from said other transmitter to said modulator to render said modulator conductive during the duration of said phasing impulses and to couple said modulator to said output circuit for said predetermined time interval, and means operative upon completion of said latter predetermined time interval to apply the facsimile signal from said other transmitter to said output circuit and to produce linear movement of the carirage of said other transmitter along the associated message drum thereby to produce scanning of the transmitting blank in said other transmitter by the associated first scanning means.

27. Facsimile transmission apparatus, comprising a pair of facsimile transmitters each having a rotatable transparent generally cylindrical message drum for holding therein a rolled transmitting blank having the subject matter to be transmitted delineated thereon and having the adjacent edges thereof spaced from each other by a gap extending longitudinally along the message drum, said message drum having a door member at one end thereof for loading said transmitting blank in said message drum, first optical scanning means for scanning said transmitting blank to produce a facsimile signal, said first scanning means including a carriage linearly movable along the message drum and having an initial position, second optical scanning means for scanning a generaly circular section of said transmitting blank to produce a phasing impulse having a given duration once each revolution of said transmitting blank and an electric motor for rotating said message drum at a given speed, an output circuit, a source of a standby tone normally coupled to said output circuit, a source of driving voltage, first relay means operative upon closing of the door of the mesasge drum of one of said transmitters for connecting the associated motor to said source of driving voltage and for decoupling said source of standby tone from said output circuit, a source of a phasing wave, a normally nonconductive modulator, means to apply the phasing impulses from said one transmitter to said modulator to render said modulator conductive during the duration of said phasing impulses, second relay means responsive to the assumption of said given speed by said motor to couple said modulator to said output circuit for a predetermined time interval, third relay means operative upon completion of said predetermined time interval to apply the facsimile signal from said one transmitter to said output circuit and to produce linear movement of the carriage of said one transmitter along the associated message drum thereby to produce scanning of the transmitting blank by the associated first scanning means, fourth relay means operative upon completion of scanning by said first scanning means of the transmitting blank in said one transmitter to disconnect the associated motor from said driving voltage source, to return the associated carriage to the initial position thereof and momentarily to apply an end-of-message tone from said source of standby signal to said output circuit, fifth relay means responsive to said completion of scanning of said one transmitter and to the loading of a transmitting blank in the message drum of the other transmitter to apply the phasing impulses from said other transmitter to said modulator to render said modulator conductive during the duration of said phasing impulses and to couple said modulator to said output circuit for said predetermined time interval, and sixth relay means operative upon completion of said latter predetermined time interval to apply the facsimile signal from said other transmitter to said output circuit and to produce linear movement of the carriage of said other transmitter along the associated message drum thereby to produce scanning of the transmitting blank in said other transmitter by the associated first scanning means.

28. Facsimile transmission apparatus, comprising scanning means for scanning a rolled transmitting blank having the subject matter to be transmitted delineated thereon thereby to produce a facsimile signal and in which the adjacent edges of the rolled blank are spaced from each other by a longitudinal gap, and including means operative periodically to produce a generally rectangular electrical impulse having a time duration determined by the width of the gap between the adjacent edges of said transmitting blank, first pulse generating means having a normal condition and an operated condition, means responsive to the leading edge of said electrical impulse to trigger said first pulse generating means from said normal condition to said operated condition thereof thereby to produce at the output of said first pulse generating means the leading edge of a generally rectangular blanking pulse at a time substantially coincident with the leading edge of said electrical impulse, second pulse generating means for generating a generally rectangular output pulse having a predetermined time duration. means responsive to the trailing edge of said electrical impulse to trigger said second pulse generating means thereby to produce said output pulse, said output pulse having a leading edge substantially coincident in time with the trailing edge of said electrical impulse and a trailing edge occurring said predetermined time thereafter, means responsive to the trailing edge of said output pulse to trigger said first pulse generating means from said operated condition thereof to said normal condition thereof thereby to produce the trailing edge of said rectangular blanking pulse, a blanking modulator circuit, an ouput circuit coupled to said blanking modulator circuit, means to apply said facsimile signal to said blanking modulator circuit thereby to apply said facsimile signal to said output circuit, means to apply said rectangular blanking pulse to said blanking modulator circuit to suppress transmission of said facsimile signal from a time corresponding to the leading edge of said electrical impulse to said predetermined time after the trailing edge thereof, a source of a phasing wave, a normally non-conductive phasing modulator intercoupling said source and said output circuit, and means to apply the output pulse of said multivibrator to said phasing modulator to render said phasing modulator conductive during said predetermined time.

29. In a facsimile transmission apparatus having means for scanning in successive lineal cycles a rolled transmitting blank bearing the subject matter to be transmitted and in which the adjacent edges of the rolled blank are spaced from each other by a longitudinal gap; means including a first photocell operative during said successive lineal cycles for scanning said blank and gap to produce pickup signals including signals representing the subject matter on the blank, an output circuit over which said pickup signals are transmitted, scanning means including a second photocell operative during each of said successive lineal cycles to produce a blanking signal, said second photocell being positioned in advance of said first photocell in the direction of scanning to initiate the start of said blanking signal before said first photocell begins to scan the gap, means for extending the period of the blanking signal until after the first photocell has completely scanned said gap, and means controlled by said blanking signal to prevent the transmission of said pickup signals over the output circuit during the period of the blanking signal.

References Cited in the file of this patent

UNITED STATES PATENTS

| | | |
|---|---|---|
| 2,469,423 | Wise et al. | May 10, 1949 |
| 2,503,311 | Wise | Apr. 11, 1950 |
| 2,511,837 | D'Humy | June 20, 1950 |
| 2,556,970 | McFarlane | June 12, 1951 |